United States Patent
Lan

(10) Patent No.: US 12,203,513 B2
(45) Date of Patent: Jan. 21, 2025

(54) SYSTEMS AND METHODS FOR SELF-PROPELLED GARDEN MACHINES

(71) Applicant: TECHTRONIC CORDLESS GP, Anderson, SC (US)

(72) Inventor: Xiaodi Lan, Dongguan (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 18/560,031

(22) PCT Filed: May 12, 2021

(86) PCT No.: PCT/CN2021/093340
§ 371 (c)(1),
(2) Date: Nov. 9, 2023

(87) PCT Pub. No.: WO2022/236734
PCT Pub. Date: Nov. 17, 2022

(65) Prior Publication Data
US 2024/0384765 A1    Nov. 21, 2024

(51) Int. Cl.
*F16D 41/08* (2006.01)
*A01D 34/68* (2006.01)
*F16D 41/067* (2006.01)

(52) U.S. Cl.
CPC ....... *F16D 41/088* (2013.01); *A01D 34/6812* (2013.01); *F16D 41/067* (2013.01)

(58) Field of Classification Search
CPC .... F16D 41/067; F16D 41/088; F16D 41/066; F16D 41/064; F16D 41/06; F16D 41/086; F16D 41/08; A01D 34/6812
See application file for complete search history.

(56) References Cited

U.S. PATENT DOCUMENTS

| | | |
|---|---|---|
| 4,783,915 A | 11/1988 | Sasaki |
| 7,540,102 B2 | 6/2009 | Olmr |

(Continued)

FOREIGN PATENT DOCUMENTS

| | | |
|---|---|---|
| CN | 201424643 Y | 3/2010 |
| CN | 201627168 U | 11/2010 |

(Continued)

OTHER PUBLICATIONS

International Search Report Corresponding with Chinese Application No. PCT/CN2021/093340 dated Nov. 2, 2021.

*Primary Examiner* — Timothy Hannon
(74) *Attorney, Agent, or Firm* — Dority & Manning, P.A.

(57) ABSTRACT

Systems and methods which provide motive forces with respect to various apparatuses using self-engaging/disengaging transmission configurations are described. An autonomous-state transmission may comprise a transmission unit configured to autonomously engage and disengage transmission of power from a driving input member to a driven output member without utilization of external gearing or additional mechanical feedback. Embodiments of an autonomous-state transmission may utilize various roller-ramp clutch configurations in communication with override control for disengaging the roller-ramp clutch. The override control may implement various configurations of a skidding mechanism for facilitating engaging and/or disengaging the roller-ramp clutch. According to some examples, motion of the driving input member and/or driven output member is utilized for override force detection and providing override control with respect to the autonomous-state transmission. Embodiments of an autonomous-state transmission may be bidirectionally operative to autonomously engage and disengage transmission of power from a driving input to a driven output.

20 Claims, 17 Drawing Sheets

(56) References Cited

U.S. PATENT DOCUMENTS

| | | | |
|---|---|---|---|
| 8,065,823 B2 | 11/2011 | Morrell | |
| 8,464,610 B1 | 6/2013 | Langenfeld | |
| 8,844,172 B2 | 9/2014 | Cmich | |
| 9,933,053 B2 | 4/2018 | Yoshimura | |
| 10,524,417 B2 | 1/2020 | Fan | |
| 10,920,386 B2 | 2/2021 | Gao | |
| 2002/0179391 A1 | 12/2002 | Cox | |
| 2019/0203778 A1* | 7/2019 | Oh | F16D 15/00 |
| 2019/0323190 A1 | 10/2019 | Waelbers | |
| 2021/0040701 A1 | 2/2021 | Yamaoka | |

FOREIGN PATENT DOCUMENTS

| | | |
|---|---|---|
| CN | 202787167 U | 3/2013 |
| CN | 103741639 B | 4/2014 |
| CN | 204282277 U | 4/2015 |
| CN | 204356727 U | 5/2015 |
| CN | 104805794 B | 7/2015 |
| CN | 106049341 B | 10/2016 |
| CN | 106869071 B | 6/2017 |
| CN | 106884402 A | 6/2017 |
| CN | 106245571 B | 12/2017 |
| CN | 206972830 U | 2/2018 |
| CN | 209456961 U | 10/2019 |
| CN | 110629721 A | 12/2019 |
| CN | 210262898 U | 4/2020 |
| CN | 211228337 U | 8/2020 |
| CN | 211228339 U | 8/2020 |
| CN | 111877244 A | 11/2020 |
| CN | 212316812 U | 1/2021 |
| CN | 212338072 U | 1/2021 |
| JP | 5200286 B2 | 6/2013 |
| WO | WO2010109664 A1 | 9/2010 |
| WO | WO2017160733 A1 | 9/2017 |

\* cited by examiner

SYSTEMS AND METHODS FOR SELF-PROPELLED GARDEN MACHINES

CROSS-REFERENCE TO RELATED APPLICATIONS

The present application claims the benefit of priority to PCT/CN2021/093340, filed on May 12, 2021, the disclosures of which are incorporated by reference herein in its entirety.

TECHNICAL FIELD

The present invention relates generally to self-propelled garden machines and, more particularly, to self-engaging/disengaging transmission techniques with respect to self-propelled garden machines.

BACKGROUND OF THE INVENTION

Garden machines of various forms are in common use for performing a number of routine tasks in daily life. For example, garden machines such as lawn mowers, snow throwers, grass edgers, tillers, etc. are used every day by persons performing work and leisure related tasks. These garden machines often comprise one or more motors of some form (e.g., electric motor or internal combustion motor) outputting power via a shaft which drive one or more implements configured for the related task. As examples, a lawn mower may drive an implement in the form of a grass cutting blade operable to shear grass, a snow thrower may drive implements in the form of an auger operable to gather and break down snow and impeller operable to propel the snow, a grass edger may drive an implement in the form of an edging blade operable to shear grass and trench soil, and a tiller may drive an implement in the form of a tine rotor operable to agitate soil. Using such garden machines, a user may be substantially relieved of the labor required to manually perform the task. However, a user is nevertheless often required to supply motive forces with respect to the garden machine, such as to push and/or pull the garden machine within or throughout an area in which the related task is performed.

Self-propelled garden machine configurations have become widespread in more recent times. A self-propelled garden machine may, for example, utilize one or more motor (e.g., electric motor or internal combustion motor) outputting power via a shaft to drive one or more wheels and/or other mobility members (e.g., tracks) for propelling the garden machine during use. A motor used for providing motive forces for a self-propelled garden machine may be the same or different motor than that used for powering the one or more implements, irrespective of whether a separate motor is utilized for the motive forces, or a motor is shared between driving the implement(s) and providing the motive forces, a self-propelled garden machine can not only relieve the user of the manual labor for performing the task but may also relieve the user of much of the effort required to move the garden machine within or throughout an area for performing the task. Implementation of self-propelled operation of a garden machine is not, however, without challenges and disadvantages.

The simplest of drivetrains (e.g., drivetrains having direct-drive, dog and spline, etc. configurations) implemented with respect to self-propelled garden machines generally prevent overrunning the motive operation of the garden machine. For example, a user is typically prevented from manually pushing the garden machine at a faster rate than provided by the self-propulsion implemented by the drivetrain when the garden machine is being self-propelled. Further, such simple drivetrains often present issues with respect to movement of the garden machine when the motor is stopped and/or moving the garden machine in a direction opposite the self-propulsion when under power by the drivetrain. For example, the wheels may remain engaged with the motor when the motor stops, requiring increased motive forces by the user (e.g., to overcome the friction of the wheels upon the ground surface and/or to manually turn the motor) if the garden machine is to be pushed or pulled in this state.

More complex drivetrains (e.g., drivetrains having clutch-based transmission mechanisms) have been implemented in self-propelled garden machines to provide an improved user experience, as generally compared to that of a simple drivetrain implementation, with respect to motive operation of the garden machine. Such complex drivetrains, however, often come at the cost of configurations which are poorly suited for or are otherwise less than ideal in environments in which the garden machine may be used and fail to provide robust solutions for addressing a number of issues with respect to movement of a garden machine.

As an example of a more complex drivetrain implementation, U.S. Pat. No. 10,524,417 to Fan et al., entitled "Walk-Behind, Self-Propelled Machine," (hereinafter "Fan", the disclosure of which is incorporated herein by reference) provides a clutch-based transmission mechanism for a lawn mower. The clutch-based transmission mechanism of Fan enables a user to manually push a lawn mower in the forward direction or pull the lawn mower in the reverse direction when the motor is turned off and the self-driving forward mode is exited and to likewise enable the user to manually push the lawn mower in the forward direction or pull the lawn mower in the reverse direction when the motor is turned off and the self-driving backward mode is exited. In providing this operability, the clutch-based transmission mechanism of Fan interfaces with the driven wheel using first and second transmission gears (e.g., gears disposed upon an output shaft of the clutch-based transmission) and corresponding first and second wheel gears (e.g., gears formed as part of the wheel assembly). Such an implementation, relying upon a combination of gears external to the clutch-based transmission mechanism itself and disposed at the wheel, is highly susceptible to damage and/or interference by lawn material (e.g., grass clippings, soil, stones, etc.) and is not well suited for the environment in which the lawn mower is used. Moreover, the clutch-based transmission mechanism implementation of Fan does not accommodate a user overrunning the motive operation of the garden machine, and thus provides a configuration in which the user is prevented from pushing/pulling the lawn mower at a faster rate than provided by the self-propulsion when the motor is turned on and either the self-driving forward mode or self-driving backward mode is implemented. Similarly, the clutch-based transmission mechanism of Fan does not accommodate a user pushing/pulling the lawn mower in a direction opposite to the movement provided by the self-propulsion when the motor is turned on and either the self-driving forward mode or self-driving backward mode is implemented, and thus the user must provide increased motive forces to overcome that of the self-propelled drivetrain.

BRIEF SUMMARY OF THE INVENTION

The present invention is directed to systems and methods which provide motive forces with respect to various apparatuses using self-engaging/disengaging transmission configurations. In accordance with embodiments of the invention, autonomous-state transmission implementations using self-engaging/disengaging transmission configurations are provided for self-propelled garden machine motive operation. For example, autonomous-state transmissions implemented in accordance with concepts of the present invention may be utilized in garden machines configured for various tasks, such as to provide robust self-propelled implementations of lawn mowers, snow throwers, grass edgers, tillers, fertilizer spreaders, garden carts, etc.

An autonomous-state transmission of embodiments of the invention may comprise a transmission unit configured to autonomously control a force transfer state (e.g., engage and disengage) with respect to transmission of power from a driving input member (e.g., shaft, gear, etc.) to a driven output member (e.g., shaft, gear, etc.) without utilization of external gearing or additional mechanical feedback. For example, an autonomous-state transmission implemented according to some aspects of the present disclosure relies exclusively upon motion of the driving input member and/or driven output member for controlling a force transfer state thereof (e.g., engaging/disengaging transmission of power from the driving input member to the driven output member). According to some examples of an autonomous-state transmission, the motion of the driving input member and/or driven output member is utilized for override force (e.g., manual force sufficient to override self-propelled motive operation, manual pushing/pulling motive operation when a motor providing motive force is off, etc.) detection and providing override control with respect to the autonomous-state transmission. Accordingly, the complete mechanism of an autonomous-state transmission of embodiments of the invention may be wholly contained within a single enclosure or contiguous housing, such as may have only a driving input member and driven output member as external interfaces.

Embodiments of an autonomous-state transmission may be bidirectionally operative to autonomously engage and disengage transmission of power from a driving input member to a driven output member. For example, a bidirectional autonomous-state transmission may operate to disengage (e.g., cease transmission of power from the driving input to the driven output) from an otherwise engaged state (e.g., providing motive forces for forward self-propulsion or backward self-propulsion) in response both to an overriding force in the motive direction (e.g., overrunning the motive operation) and an overriding force opposite the motive direction (e.g., underrunning the motive operation). As a specific example, a bidirectional autonomous-state transmission of an example embodiment is configured to transition from an engaged state to a disengaged state in response to a user pushing a walk-behind garden machine equipped with the bidirectional autonomous-state transmission with sufficient force to override self-propelled motive operation (e.g., override force) and manually push the garden machine at a faster rate than the self-propulsion provided by the bidirectional autonomous-state transmission (e.g., overrunning the bidirectional autonomous-state transmission). Further, the bidirectional autonomous-state transmission of this example embodiment is configured to transition from an engaged state to a disengaged state in response to the user pulling the walk-behind garden machine equipped with the bidirectional autonomous-state transmission with sufficient force to override self-propelled motive operation to manually retard the movement of the garden machine at a slower rate than (or even reverse) the self-propulsion provided by the bidirectional autonomous-state transmission (e.g., underrunning the bidirectional autonomous-state transmission).

Self-engaging/disengaging transmission configurations of an autonomous-state transmission may implement a clutch and associated override control. For example, embodiments of an autonomous-state transmission may utilize various roller-ramp clutch configurations in communication with override control for disengaging the roller-ramp clutch. The override control of the foregoing embodiments of an autonomous-state transmission may, for example, implement various configurations of a skidding mechanism for facilitating engaging and/or disengaging the roller-ramp clutch (e.g., based on override forces from overrunning and/or underrunning, manual motive operation, etc.). A skidding mechanism of embodiments of override control of an autonomous-state transmission may, for example, be configured for skidding action whereby the override control does not interfere with an engaged state of a clutch in normal motive operation. However, a skidding mechanism of embodiments of the override control may be configured for non-skidding action in response to override forces (e.g., overrunning and/or underrunning) transmitted via a driven output member to provide feedback control with respect to a disengaged state of the clutch.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Various configurations of self-propelled garden machines may be used for performing a number of work or leisure related tasks. For example, garden machines such as lawn mowers, snow throwers, grass edgers, tillers, fertilizer spreaders, garden carts, etc. may be provided with one or more motors (e.g., electric motors or internal combustion motors) and associated drivetrains (e.g., driveshafts, gears, clutches, axles, etc.) configured for self-propelled motive operation of the garden machine. For example, one or more wheels and/or other mobility members (e.g., tracks) may be driven by one or more motors of a self-propelled garden machine so as to relieve a user of much of the effort required to move the garden machine, such as when operating the garden machine to perform a respective task.

A drivetrain configuration of various garden machines may implement an autonomous-state transmission according to concepts of the present disclosure. In accordance with embodiments of the invention, autonomous-state transmission implementations comprise self-engaging/disengaging transmission configurations for self-propelled garden machine motive operation. For example, an autonomous-state transmission of embodiments of the invention may comprise a transmission unit configured to autonomously engage and disengage transmission of power from a driving input member (e.g., shaft, gear, etc.) to a driven output member (e.g., shaft, gear, etc.) without utilization of external gearing or additional mechanical feedback. Autonomous-state transmission configurations of embodiments of the invention may, for example, be utilized to facilitate robust self-propelled implementations of garden machines, such as by providing drivetrains that are well suited for use in environments in which the garden machine may be used, accommodating overrunning and/or underrunning of self-propelled motive operation, etc.

Figure 1A:
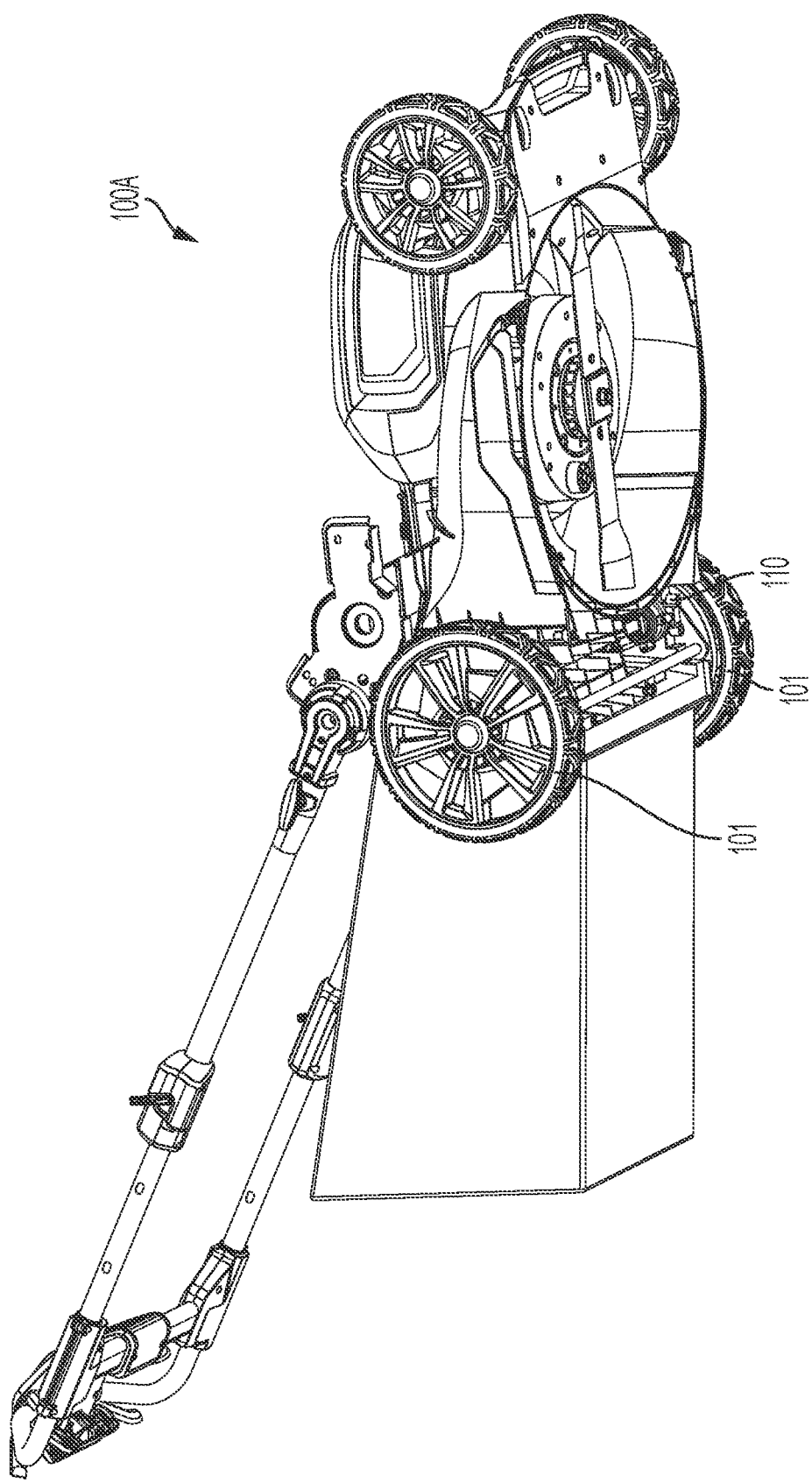
FIGS. 1A and 1B show examples of self-propelled garden machines in which autonomous-state transmissions of embodiments of the invention are disposed.
Figure 1B:
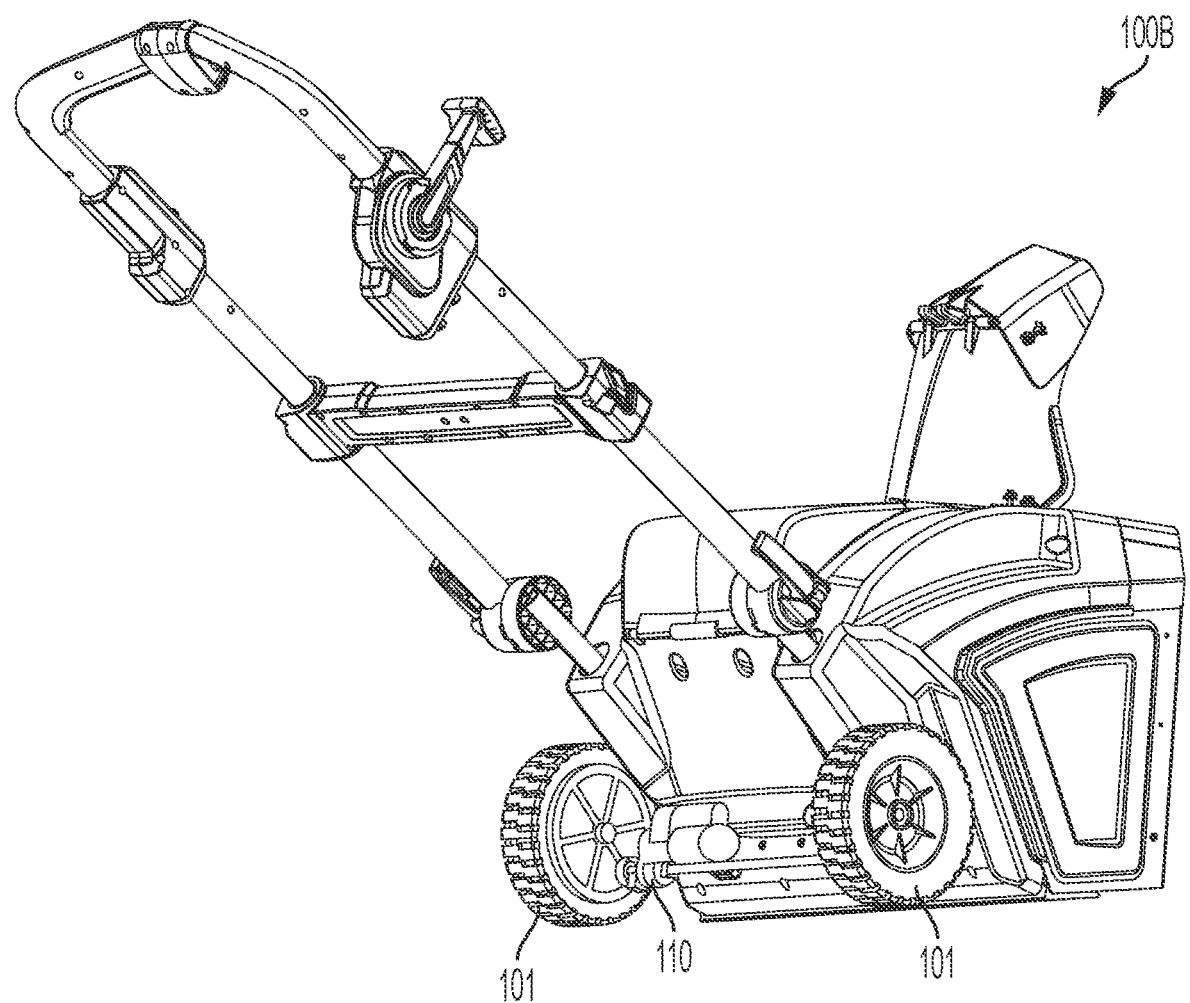

FIGS. 1A and 1B show examples of self-propelled garden machines in which an autonomous-state transmission of embodiments of the invention is disposed. In particular, FIG. 1A illustrates an example of a self-propelled garden machine implementation as lawn mower 100A and FIG. 1B illustrates an example of a self-propelled garden machine implementation as snow thrower 100B. It should be appreciated that lawn mower 100A and snow thrower 100B am exemplary configurations of a self-propelled garden machine in which an autonomous-state transmission may be utilized and are not intended to limit the applicability of autonomous-state transmissions implemented in accordance with concepts herein.

Each of the examples illustrated in FIGS. 1A and 1B includes autonomous-state transmission 110, embodiments of which are further described below, configured according to concepts of the present invention to drive wheels 101. Autonomous-state transmission 110 may, for example, be driven by a motor provided to supply motive power to the self-propelled garden machine. According to alternative embodiments, autonomous-state transmission 110 may be driven by a motor provided to drive an implement of the self-propelled garden machine.

The complete mechanism of autonomous-state transmission 110 of the embodiments of FIGS. 1A and 1B is wholly contained within a single enclosure or contiguous housing. Accordingly, autonomous-state transmission 110 of the illustrated embodiments presents a configuration in which its external interfaces comprise only a driving input member and driven output member. Autonomous-state transmission 110 implemented according to some aspects of the present disclosure relies exclusively upon motion of the driving input member and/or driven output member for engaging/disengaging transmission of power from the driving input member to the driven output member.

FIGS. 2A-2J and 3A-3F show details with respect to exemplary implementations of an autonomous-state transmission according to concepts of the present disclosure. Autonomous-state transmission 210 of FIGS. 2A-2J and autonomous-state transmission 310 of FIGS. 3A-3F may, for example, comprise a configuration of autonomous-state transmission 110 of FIG. 1A and/or FIG. 1B. It should be appreciated, however, that autonomous-state transmission 210 and autonomous-state transmission 310 may be utilized with respect to configurations of self-propelled garden machines in addition to or in the alternative to lawn mower 110A and/or snow thrower 100B.

Referring first to FIGS. 2A-2J, the illustrated embodiment of autonomous-state transmission 210 will be described to aid in understanding concepts of the present invention. It should be understood that, although a particular configuration of autonomous-state transmission 210 is shown and described, various changes, substitutions, and alterations may be made with respect to one or more components of the example of autonomous-state transmission 210 without departing from the spirit and scope of the invention.

Figure 2A:
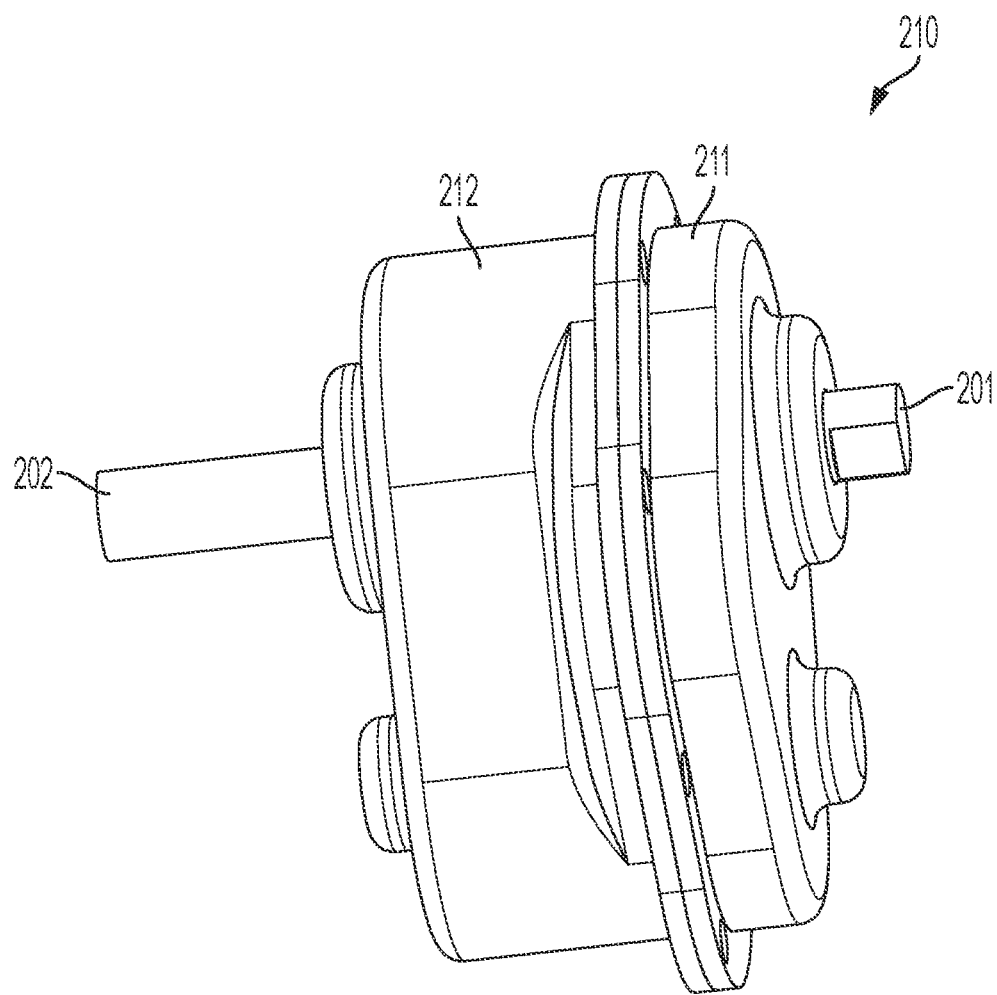
FIGS. 2A-2J show various views of a first exemplary autonomous-state transmission of embodiments of the invention.

As shown in FIG. 2A, autonomous-state transmission 210 includes a driving input member (shown as driving shaft 201) and driven output member (shown as driven shaft 202). The driving input member may be provided motive power with respect to a self-propelled garden machine by one or more motors of the garden machine. Autonomous-state transmission 210 autonomously engages and disengages transmission of power from driving shaft 201 to driven shaft 202. Driven shaft 202 may be in communication with one or more motive members (e.g., wheels, tracks, etc.) of a self-propelled garden machine so as to facilitate self-propelled motive operation of the garden machine. It should be appreciated that driving shaft 201 and/or driven shaft 202 of embodiments of autonomous-state transmission 210 may be configured differently than shown, such as to provide input and/or output gears, universal joints, etc.

Autonomous-state transmission 210 of the illustrated embodiment in FIG. 2A is provided in a configuration in which its external interfaces comprise only a driving input member (driving shaft 201) and a driven output member (driven shaft 202), wherein the remainder of the componentry thereof is disposed within an enclosure or housing formed from mating cases 211 and 212. Accordingly, the motion of driving shaft 201 (e.g., the driving input) and/or driven shaft. 202 (e.g., the driven output) of autonomous-state transmission 210 is utilized for override force (e.g., manual force sufficient to override self-propelled motive operation of the garden machine) detection and providing override control with respect to a force transfer state of autonomous-state transmission 210.

Figure 2B:
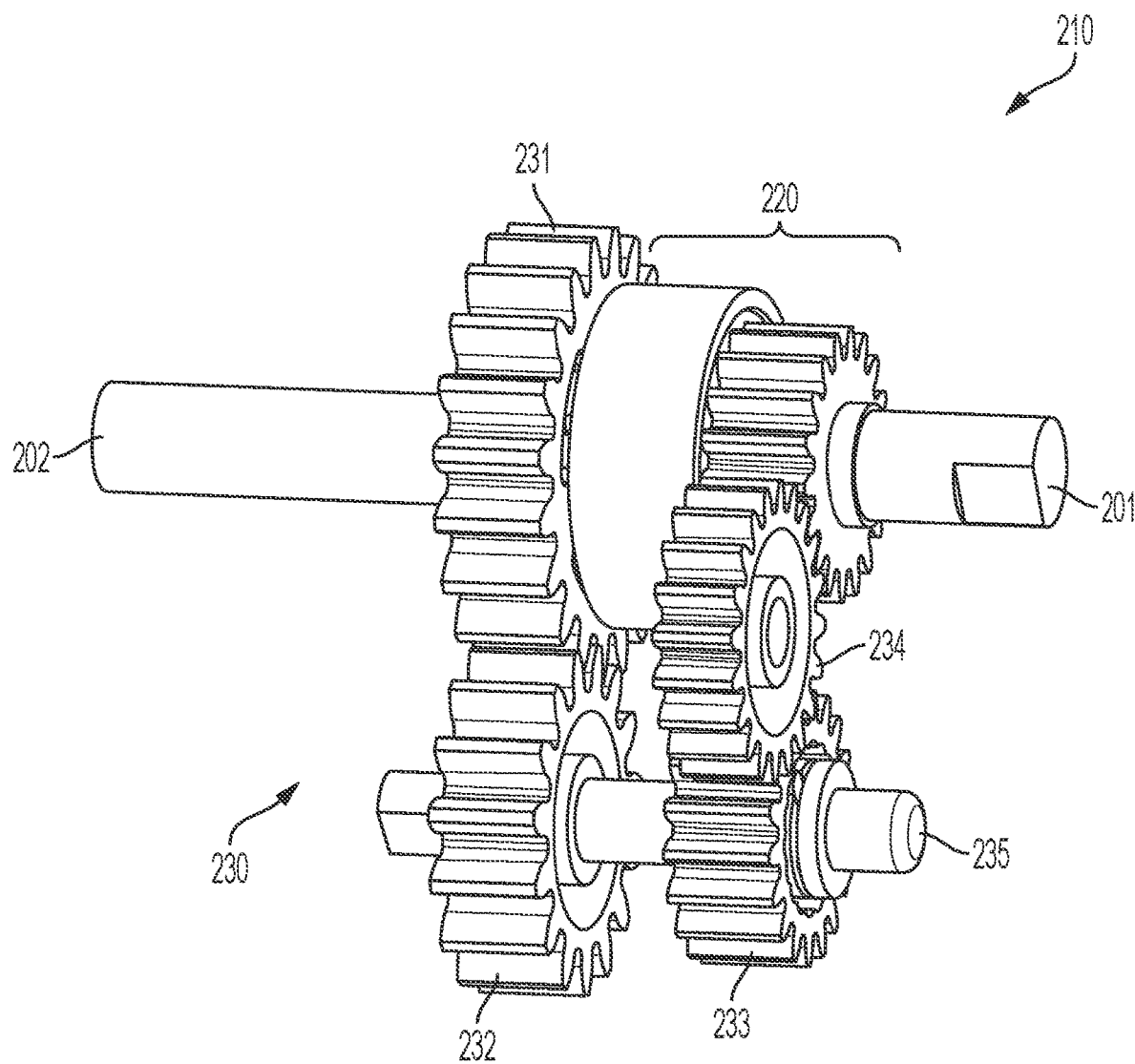
Figure 2C:
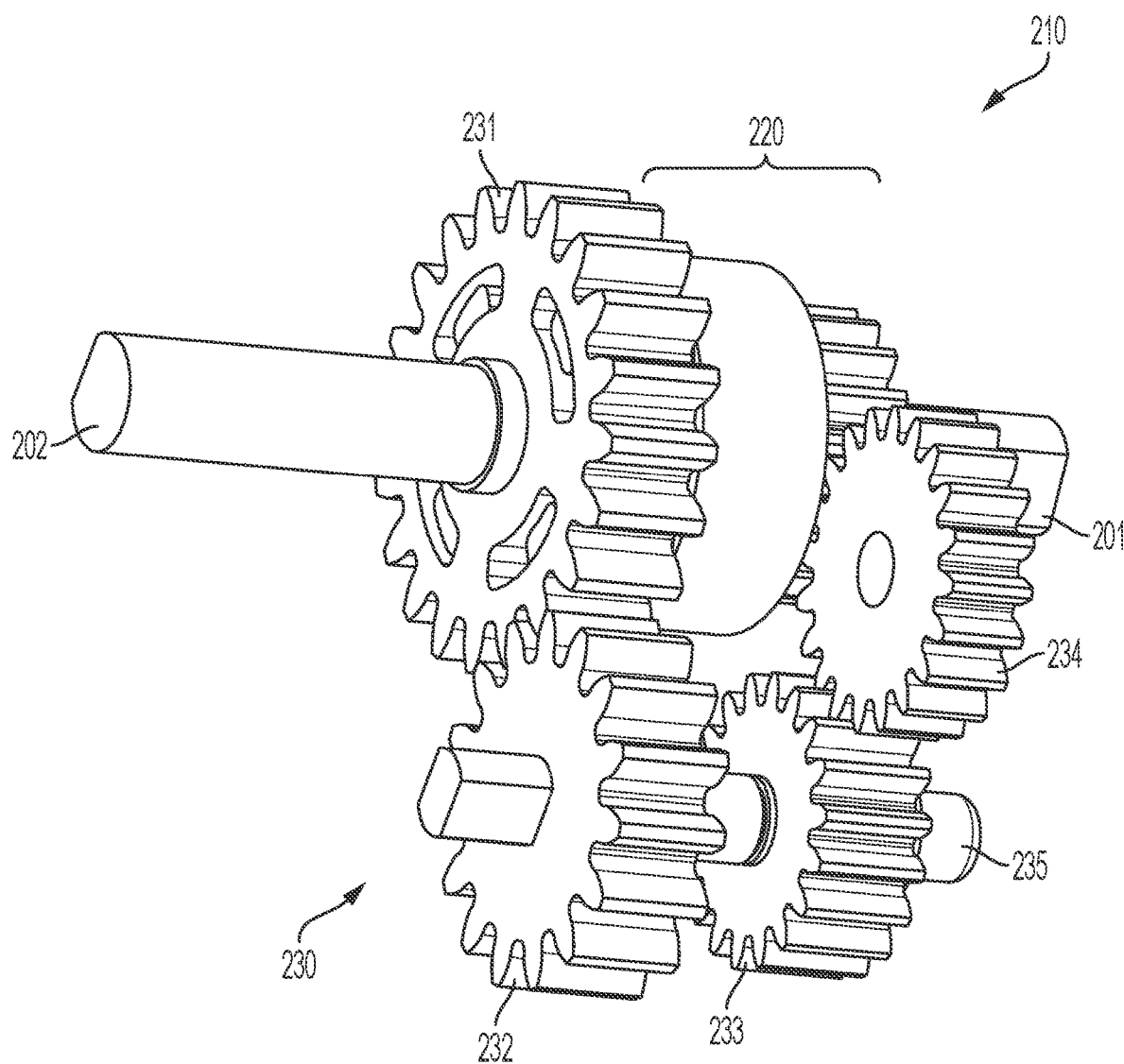

FIGS. 2B and 2C show autonomous-state transmission 210 having mating cases 211 and 212, and corresponding input and output bearings, removed to thereby expose internal componentry thereof. Autonomous-state transmission 210 implements a clutch and associated override control configuration. Accordingly, the illustrated embodiment of autonomous-state transmission 210 includes clutch assembly 220 configured for selectively transferring motive force provided via driving shaft 201 to driven shaft 202. Correspondingly, autonomous-state transmission 210 of the illustrated embodiment further includes override force feedback assembly 230, comprising gears 231-234 and shaft 235, configured for selectively communicating override forces provided via driven shaft 202 to clutch assembly 220, facilitating override control with respect to autonomous-state transmission 210.

Figure 2D:
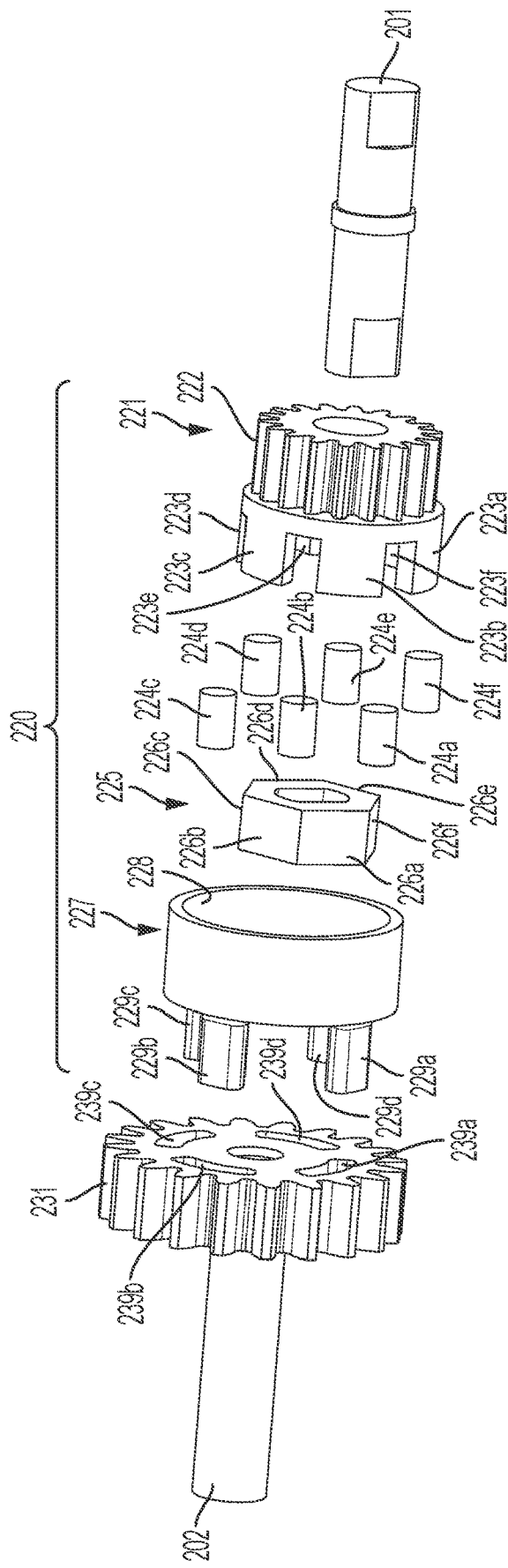

Clutch assembly 220 of embodiments of autonomous-state transmission 210 comprises a roller-ramp clutch configuration in communication with override force feedback assembly 230 facilitating control for disengaging the roller-ramp clutch. As shown in FIG. 2D, an exemplary roller-ramp clutch configuration of clutch assembly 220 comprises inner ring 225 coupled to driving shaft 201 and outer ring 227 coupled to driven shaft 202, inner ring 225 is preferably coupled to driving shaft 201 such that rotation of driving shaft is transferred to inner ring 225 substantially without slipping of inner ring with respect to driving shaft 201. In contrast, override control interface 221 is preferably provided in a slipping relationship with respect to driving shaft 201, such that at least some extent of rotational slippage of override control interface 221 is accommodated in relation to rotation of driving shaft 201.

In the roller-ramp clutch configuration of FIG. 2D, inner ring 225 nests within a circumference of inward surface 228 of outer ring 227. Inner ring 225 comprises an eccentric outer surface comprising roller-ramp surfaces 226a-226f, wherein the apexes provided at the junctions of the roller-ramp surfaces (e.g., the apex at the junction of roller-ramp surfaces 226a and 226b, the apex at the junction of roller-ramp surfaces 226b and 226c, and so on) are disposed more near inward surface 228 of outer ring 227 than is the remaining areas of the roller-ramp surfaces. Rolling members 224a-224f (e.g., cylindrical pins) of clutch assembly 220 are disposed in the area between facing surfaces of a corresponding one of roller-ramp surfaces 226a-226f and inward surface 228. The space or gaps between the apexes of roller-ramp surfaces 226a-226f and inward surface 228 is preferably less than a diameter of rolling members 224a-224f. Roller-ramp surfaces 226a-226f of inner ring 225, rolling members 224a-224f, and inward surface 228 of outer ring 227 of embodiments cooperate to enable engaged and disengaged modes of clutch assembly 220.

FIGS. 4A-4D illustrate cooperative interaction with respect to a roller-ramp surface of an inner ring, a rolling member, and an inward surface of an outer ring of an exemplary roller-ramp clutch configuration. Inner ring 425 may, for example, correspond to inner ring 225 of clutch assembly 220 described above and inner ring 325 of clutch assembly 320 described below, wherein roller-ramp surface 426 may represent any roller-ramp surface thereof. Similarly, rolling member 424 may represent any rolling member of clutch assembly 220 and clutch assembly 320. Outer ring 427, having inward surface 428, may correspond to outer ring 227, having inward surface 228, and outer ring 327, having inward surface 328. As with the embodiments of clutch assemblies 220 and 320, inner ring 425 may be coupled to a driving input member (e.g., driving shaft, gear, etc. in communication with a motor) and outer ring 427 may be coupled to a driven output member (e.g., driven shaft, gear, etc. in communication with a motive member).

Figure 4A:
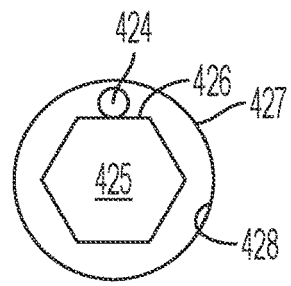
FIGS. 4A-4D show schematic illustrations of operation of portions of a roller-ramp clutch mechanism utilized according to embodiments of the invention.
Figure 4B:
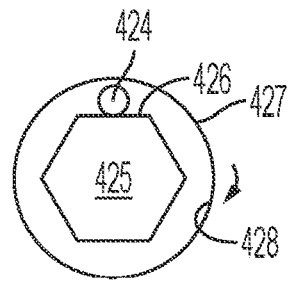

FIG. 4A shows a disengaged mode with respect to the illustrated roller-ramp clutch configuration. For example, when the driving input member and driven output member are at rest (e.g., a motor for powering the driving input member is off and a garden machine in which the roller-ramp clutch configuration is disposed is not undergoing manual movement), rolling member 424 may rest at or towards the center of roller-ramp surface 426 (e.g., rolling member neutral or disengaged position) where the area between inward surface 428 and roller-ramp surface 426 is the greatest. Accordingly, rolling member 424 is not in simultaneous and/or firm contact with both roller-ramp surface 426 and inward surface 428, and the roller-ramp clutch is disengaged. In the disengaged mode, outer ring 427 and inner ring 425 are free to move relative to one another (e.g., one ring may rotate while the other remains stationary, one ring may rotate at a different speed than the other ring, etc.). For example, as shown in the disengaged mode operation of FIG. 413, should a force be applied to cause outer ring 427 and inner ring 425 to move relative to one another (e.g., a garden machine in which the roller-ramp clutch configuration is disposed is undergoing manual movement from a user pushing the garden machine), rolling member 424 is free to roll in the area between facing surfaces of roller-ramp surface 426 and inward surface 428 (e.g., rolling member 424 disengaged position). In operation according to embodiments, outer ring 424 and inner ring 425 rotate together, whereby rolling member 424 is free to move within the space between the inner and outer rings (e.g., rolling member 424 may be encouraged to roll in one direction by outer ring 424 and in the opposite direction by roller-ramp surface 426 of inner ring 425 resulting in rolling member wandering within the space). Throughout this disengaged operation, rolling member 424 may remain within a central area of roller-ramp surface 426 (e.g., away from the apexes between roller-ramp surface 426 and adjacent roller-ramp surfaces of inner ring 425), avoiding simultaneous and/or firm contact with both roller-ramp surface 426 and inward surface 428, and the rolling-ramp clutch configuration remains disengaged and does not transfer motive force between a driving input member and a driven output member.

Figure 4C:
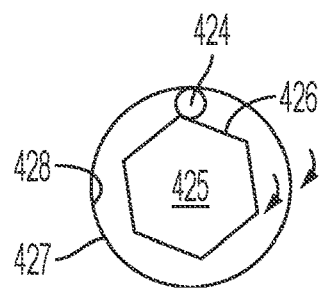

FIG. 4C shows an engaged mode with respect to the illustrated roller-ramp clutch configuration. For example, when the driving input member is being driven (e.g., a motor for powering a garden machine in which the roller-ramp clutch configuration is disposed is applying force to the driving input) and inner ring 425 is rotated (e.g., clockwise in the illustration), rolling member 424 may be encouraged to move towards an end of roller-ramp surface 426 (e.g., near an apex between roller-ramp surface 426 and an adjacent roller-ramp surface of inner ring 425) where the area between inward surface 428 and roller-ramp surface 426 is the greatest. Accordingly, rolling member 424 becomes simultaneously and firmly in contact with both roller-ramp surface 426 and inward surface 428 (e.g., pinched so as to prevent rolling of rolling member 424, thereby disposing rolling member 424 in an engaged position), and the roller-ramp clutch is engaged. In the engaged mode, outer ring 427 and inner ring 425 are no longer free to move relative to one another. Through this operation, the rolling-ramp clutch configuration in the engaged mode may transfer motive force between a driving input member and a driven output member.

Figure 4D:
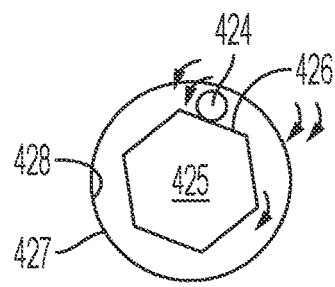

The engaged mode roller-ramp clutch of FIG. 4C may become disengaged in various ways. For example, an engaged roller-ramp clutch configuration may again become disengaged when application of force to inner ring 425 is ceased (e.g., motive force provided to a driving input by a motor for powering a garden machine in which the roller-ramp clutch configuration is disposed is terminated). As another example, an engaged roller-ramp clutch configuration may become disengaged when overrun (e.g., a sufficient overriding force is provided in the motive direction of a garden machine in which the roller-ramp clutch configuration is disposed overruns the motive operation of the garden machine). Disengaging of the roller-ramp clutch configuration due to overrunning is illustrated in FIG. 4D, wherein an overrunning force causes outer ring 427 to rotate at a more rapid rate than inner ring 425, at least for a short period of time (e.g., buffering operation of embodiments of the invention, described in further detail below, facilitates the outer ring briefly rotating at a more rapid rate than the inner ring followed by rotation of the other and inner rings remaining stationary relative to each other). Through this overrunning force, rolling member 424 is freed from its simultaneous and/or firm contact with both roller-ramp surface 426 and inward surface 428. Thus, rolling member 424 may migrate to a central area of roller-ramp surface 426 (e.g., away from the apexes between roller-ramp surface 426 and adjacent roller-ramp surfaces of inner ring 425), becoming disengaged and no longer transferring motive force between a driving input member and a driven output member.

Referring again to FIG. 2D, the roller-ramp configuration of clutch assembly 220 engages to transfer motive force provided via driving shaft 201 to driven shaft 202 when one or more of rolling members 224a-224f are in simultaneous, firm contact (e.g., pinched so as to prevent their rolling) with their corresponding roller-ramp surface of inner ring 225 and inward surface 228 of outer ring 227. Accordingly, when driven shaft 202 is turned either clockwise or counterclockwise inner ring 225 turns accordingly, such that turning driven shaft 202 and inner ring 225 with sufficient speed and force will exert centrifugal forces sufficient to encourage rolling members 224a-224f toward respective apexes of the roller-ramp and engage inward surface 228 and be captured in a non-rolling relationship between outer ring 227 and inner ring 225. Inversely, the roller-ramp configuration of clutch assembly 220 disengages to preclude transfer of motive force from driving shaft 201 to driven shaft 202 when rolling members 224a-224f are in a rolling relationship with their corresponding roller-ramp surface of inner ring 225 and/or inward surface 228 of outer ring 227 (e.g., rolling within the area between a rolling-ramp surface of rolling-ramp surfaces 226a-226f and inward surface 228).

The exemplary roller-ramp clutch configuration of clutch assembly 220 shown in FIG. 2D comprises override control interface 221 operative in cooperation with override force feedback assembly 230 for disengaging the roller-ramp clutch in response to override forces provided via driven shaft 202 to clutch assembly 220. Override control interface 221 of the illustrated embodiment includes gear portion 222 and rolling member holders 223a-223f. According to embodiments of clutch assembly 220, override control interface 221 is disposed in a partially nested relationship with respect to outer ring 227 and inner ring 225. A partially nested implementation of override control interface 221 disposes rolling member holders 223a-223f within the area between facing surfaces of inward surface 228 and roller-ramp surfaces 226a-226f, wherein rolling member holders 223a-223f are interleaved with rolling members 224a-224f. That is, in a partially nested implementation of embodiments, rolling member 224a is disposed between rolling member holders 223a and 223b, rolling member 224b is disposed between rolling member holders 223b and 223c, and so on including rolling member 224f disposed between rolling member holders 223f and 223a.

In operation according to embodiments of the invention, rolling member holders 223a-223f of override control interface 221 may be utilized to encourage or otherwise facilitate engaged and/or disengaged positioning of rolling members 224a-224f. Rolling member holders 223a-223f of embodiments may be controlled to facilitate engaged and/or disengaged positions with respect to rolling members 224a-224f via force transferred by override force feedback assembly 230 through gear portion 222. For example, an override force provided to driven shaft 202 may be transferred to override control interface 221 by override force feedback assembly 230 through gear portion 222, which may cause rolling member holders 223a-223f to move relative to rolling members 224a-224f and encourage and/or discourage their engaged and/or disengaged positions. When an override force is not provided to driven shaft 202, however, override force feedback assembly 230 is configured to enable override control interface 221 to facilitate rolling members 224a-224f entering and/or remaining in engaged positions.

Figure 2E:
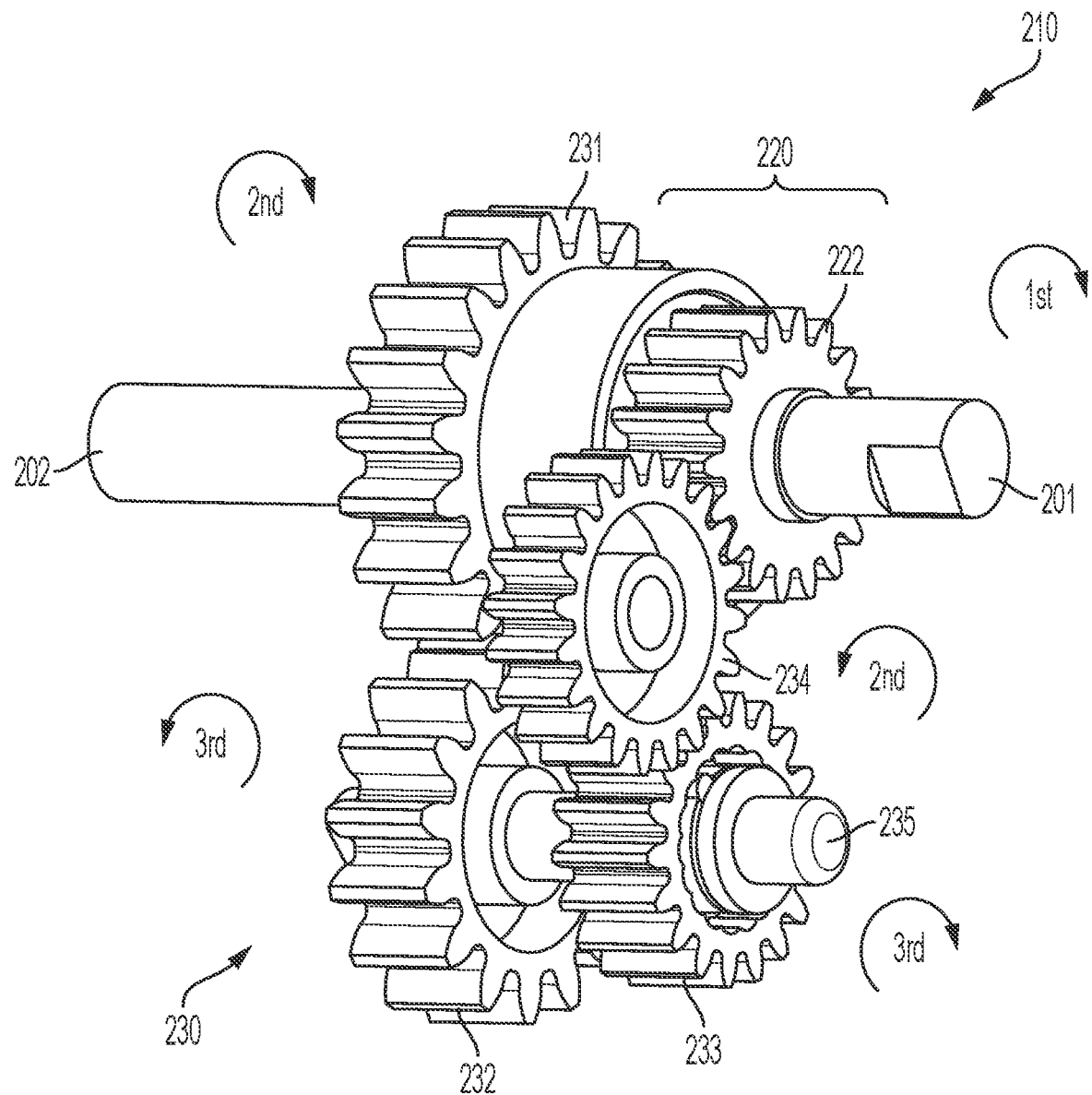

FIG. 2E shows operation of autonomous-state transmission 210 with clutch assembly 220 in an engaged mode according to an example of the disclosure, wherein the direction of rotational force with respect to various components is indicated by the associated angular velocity vectors. The numerals provided in association with the angular velocity vectors shown in FIG. 2E designate the order of transmission of force by the gear components of the example autonomous-state transmission.

The example of FIG. 2E may, for example, correspond to a situation in which a garden machine in which autonomous-state transmission 210 is disposed is operating in the self-propel mode. Although a particular direction (e.g., forward drive or rearward drive) of input/output rotational force (e.g., indicated by the clockwise and counterclockwise angular velocity vectors) is provided, the described operation applies to either forward drive or rearward drive (although the directions of rotational force are reversed).

The example illustrated in FIG. 2E shows operation in which a drive force (e.g. $1^{st}$ order clockwise input force) is applied to driving shaft 201, whereby this force is transmitted to driven shaft 202 through clutch assembly 220 operating in an engaged mode to provide the drive force output (e.g., $2^{nd}$ order clockwise output force). As shown in the cross-sectional view of clutch assembly 220 illustrated in FIG. 2F, rolling members 224a-224f in their engaged positions may impinge upon rolling member holders 223a-223f of override control interface 221, whereby rolling member holders 223a-223f operate to block rolling members 224a-224f from moving from the engaged positions to disengaged positions. In this situation, override control interface 221 is encouraged to rotate according to the drive force applied to driving shaft 201. Thus, gear portion 222 of override control interface 221 transmits force to gear 234 (e.g., inducing a $2^{nd}$ order counterclockwise force) of override force feedback assembly 230. Correspondingly, gear 234 transmits force to gear 233 (e.g., inducing a 34 order clockwise force) of override force feedback assembly 230. Simultaneously, gear 231 coupled to driven shaft 202 is encouraged to rotate clockwise (e.g., $2^{nd}$ order clockwise output force) according to the drive force (e.g., $1^{st}$ order clockwise input force) by drive members 229a-229d of outer ring 227 engaging ends of circumferential slots 239a-239d (FIG. 2D) disposed in gear 231. Thus, gear 231 transmits force to gear 232 (e.g., inducing a $3^{rd}$ order counterclockwise force) of override force feedback assembly 230.

As can be seen in the illustration of FIG. 2E, when operating in the exemplary engaged mode, gears 232 and 233 of override force feedback assembly 230 are rotating in contrariwise directions (e.g., gear 232 rotating in a counterclockwise direction and gear 233 rotating in a clockwise direction). Accordingly, shaft 235 of override force feedback assembly 230 preferably accommodates at least some extent of rotational slippage with respect to gears 232 and 233. In accordance with some embodiments of the invention, shaft 235 and gear 233 are interfaced via a skidding mechanism facilitating limited slipping between shaft 235 and gear 233.

Figure 2G:
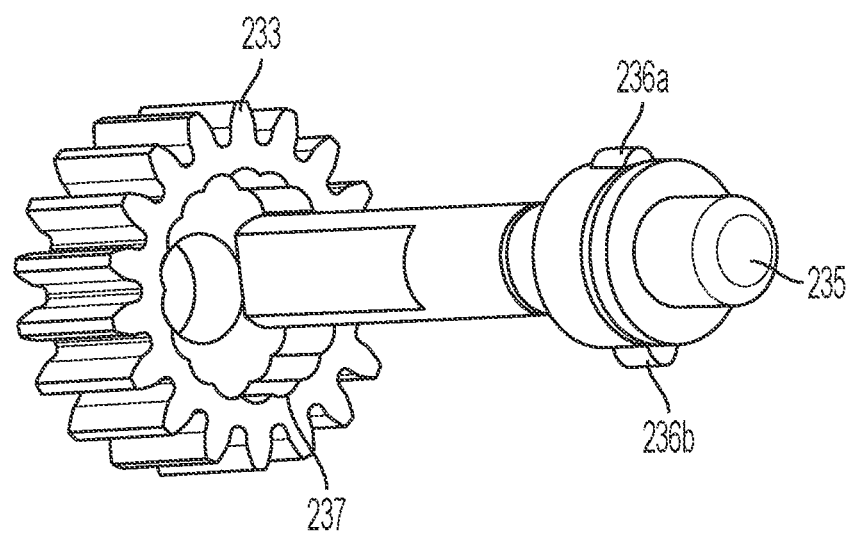

FIG. 2G shows an exploded diagram comprising an embodiment of gear 233 removed from shaft 235, wherein portions of an exemplary skidding mechanism arm visible. In the illustrated example, shaft 235 includes tab elements 236a and 236b. Tab elements 236a and 236b may, for example, comprise spring biased sliding members disposed within a hub of shaft 235. Correspondingly, in addition to having an orifice for slidably accepting the body of shaft 235, gear 233 includes undulating inner surface 237. Tab element 236a and 236b engage undulating inner surface 237 to facilitate skidding of gear 233 relative to rotation of shaft 235 when a suitable relative force is present with respect to the rotation of shaft 235 and gear 233. Embodiments of the foregoing skidding mechanism are configured for skidding action whereby the override control does not interfere with an engaged state of a clutch in normal motive operation. For example, the depth of undulations of undulating inner surface 237, the extended and/or contracted length of tab elements 236a and 236b, and/or the force of a spring bias provided to tab elements 236a and 236b encouraging their extension and protrusion from the hub of shaft 236 may be configured to accommodate skidding of gear 233 with respect to rotation of shaft 235 when gears 232 and 233 are rotating in contrariwise directions associated with autonomous-state transmission 210 with clutch assembly 220 in an engaged mode.

Figure 2H:
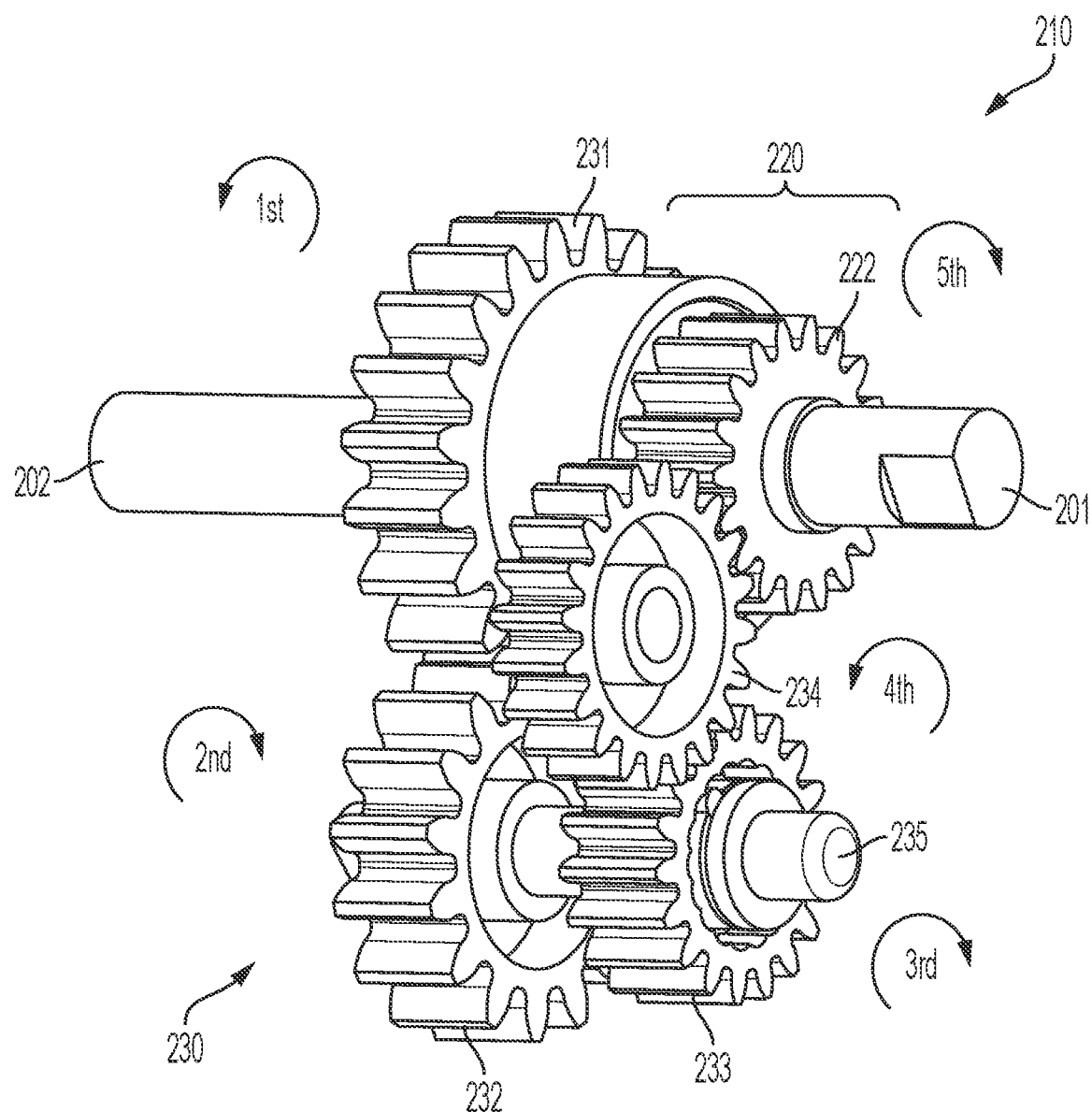
Figure 2F:
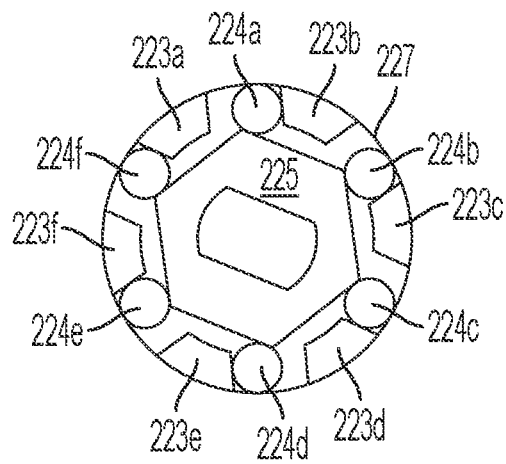

FIG. 2H shows operation of autonomous-state transmission 210 with clutch assembly 220 in a disengaged mode according to an example of the disclosure, wherein the direction of rotational force with respect to various components is indicated by the associated angular velocity vectors. As with the previous example, the numerals provided in association with the angular velocity vectors shown in FIG. 2H designate the order of transmission of force by the gear components of the example autonomous-state transmission.

The example of FIG. 2H may, for example, correspond to a situation in which a garden machine in which autonomous-state transmission 210 is disposed is being manually pushed while a motor for providing motive force is turned off. Although a particular direction (e.g., pushing or pulling of a garden machine) of rotational force (e.g., indicated by the clockwise and counterclockwise angular velocity vectors) is provided, the described operation applies to movement in either direction (although the directions of rotational force are reversed). Further, the operational description of the example also applies to overrun mode (e.g., where a user overruns the motive operation of the garden machine), although in that situation the clockwise and counterclockwise denotation is a relative rather than absolute. Accordingly, the illustrated configuration of autonomous-state transmission 210 provides a bidirectional autonomous-state transmission configuration which may operate to disengage (e.g., cease transmission of power from the driving input to the driven output) from an otherwise engaged state (e.g., providing motive forces for forward self-propulsion or backward self-propulsion) in response both to an overriding force in the motive direction (e.g., overrunning force associated with overrunning the motive operation) and an overriding force opposite the motive direction (e.g., underrunning force associated with underrunning the motive operation). In particular, bidirectional autonomous-state transmission 210 is configured to transition from an engaged state to a disengaged state in response to a user pushing a walk-behind garden machine equipped with the bidirectional autonomous-state transmission with sufficient force to override self-propelled motive operation (e.g., override force) and manually push the garden machine at a faster rate than the self-propulsion provided by the bidirectional autonomous-state transmission (e.g., overrunning the bidirectional autonomous-state transmission). Further, bidirectional autonomous-state transmission 210 is configured to transition from an engaged state to a disengaged state in response to the user pulling the walk-behind garden machine equipped with the bidirectional autonomous-state transmission with sufficient force to override self-propelled motive operation to manually retard the movement of the garden machine at a slower rate than (or even reverse) the self-propulsion provided by the bidirectional autonomous-state transmission (e.g., underrunning the bidirectional autonomous-state transmission).

The example illustrated in FIG. 2H shows operation in which a force (e.g., $1^{st}$ order counterclockwise force), such as associated with a user manually pushing or overrunning self-propelled operation of a garden machine, is applied to driven shaft 202. In a situation where clutch assembly 220 was operating in an engaged mode immediately prior to the application of the noted force at driven shaft 202, rotation of shaft 202 may provide corresponding rotation of gear 231 (e.g., the $1^{st}$ order counterclockwise force) attached thereto, without initially also causing rotation of outer ring 227 of clutch assembly 220. That is, drive members 229a-229d of outer ring 227 may be disposed to engage first ends of circumferential slots 239a-239d (FIG. 2D) disposed in gear 231, whereby rotation of shaft 202 and gear 231 proceeds without inducing rotation of outer ring 227 until drive members 229a-229d travers the lengths of circumferential slots 239a-239d and engage second (opposite) ends thereof. Nevertheless, force is transmitted by gear 231 to gear 232 (e.g., inducing a $2^{nd}$ order clockwise force) of override force feedback assembly 230. Gear 232, transmits the rotational force to shaft 235 attached thereto.

As described above, shaft 235 of embodiments of override force feedback assembly 230 accommodates at least some extent of rotational slippage with respect to gears 232 and 233. For example, the example illustrated in FIG. 2G provides a skidding mechanism facilitating limited slipping between shaft 235 and gear 233. In the current example, a motor providing motive force is off, such that rotational force is not being transmitted to override force feedback assembly 230 by gear portion 222 of override control interface 221. Similarly, in overrun mode operation, the relative rotational forces produce the same effect. Accordingly, in these situations, gear 233 of embodiments engages shaft 235 in a non-skidding relationship such that gear 232 transmits rotational force to gear 233 (e.g., inducing a $3^{rd}$ order clockwise force). That is, although a hub of shaft 235 is configured to accommodate skidding of gear 233 with respect to rotation of shaft 235 when gears 232 and 233 are rotating in contrariwise directions associated with autonomous-state transmission 210 with clutch assembly 220 in an engaged mode, the hub is configured to engage gear 233 without skidding with respect to rotation of shaft 235 when autonomous-state transmission 210 is receiving override force via shaft 202. Embodiments of the foregoing skidding mechanism are configured for non-skidding action in response to override forces (e.g., overrunning and/or underrunning) transmitted via shaft 202 to provide feedback control with respect to a disengaged state of clutch assembly 220. For example, the depth of undulations of undulating inner surface 237 (FIG. 2G), the extended and/or contracted length of tab elements 236a and 236b (FIG. 2G), and/or the force of a spring bias provided to tab elements 236a and 236b encouraging their extension and protrusion from the hub of shaft 236 may be configured to accommodate non-skidding of gear 233 with respect to rotation of shaft 235 when overriding force is present with respect to shaft 202 consistent with operation of clutch assembly 220 in a disengaged mode. In accordance with embodiments of the invention, one or more aspects of a skidding mechanism of autonomous-state transmission 210 are selected so that skidding action occurs during self-propelled motive operation of a garden machine in which the autonomous-state transmission is disposed, while non-skidding action occurs during overrunning and/or underrunning the motive operation of the garden machine.

Figure 2I:
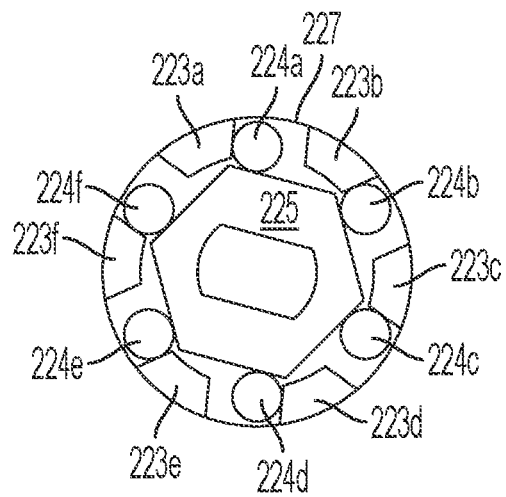

In operation according to the illustrated example, force is transmitted by gear 233 to gear 234 (e.g., inducing $4^{th}$ order counterclockwise force) of override force feedback assembly 230. Gear 234 interfaces with gear portion 222 of override control interface 221, and thus transmits force (e.g., clockwise $5^{th}$ order clockwise force) to override control interface 221 of clutch assembly 220. Rotation of override control interface 221 provides for corresponding movement of rolling member holders 223a-223f thereof. As shown in FIG. 2I, where clutch assembly 220 is initially in an engaged mode (e.g., FIG. 2F), rolling member holders 223a-223f may rotate (e.g., clockwise in this example) to move away from corresponding ones of rolling members 224a-224f (e.g., rolling member holders 223a-223f may cease to impinge upon rolling members 224a-224fa and encourage or otherwise facilitate disengaged positioning of rolling members 224a-224f.

Figure 2J:
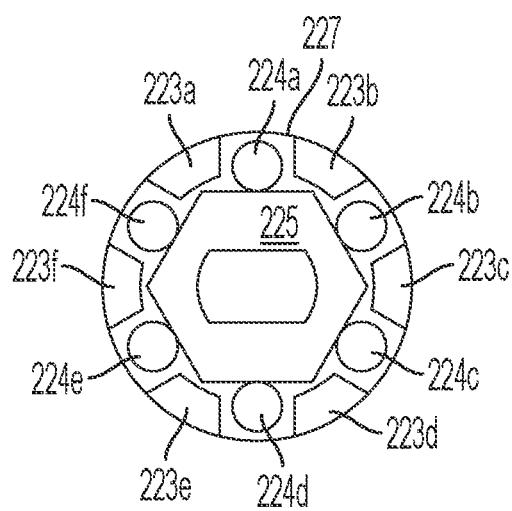

In accordance with embodiments of clutch assembly 220, with rolling member holders 223a-223f not in a position to encourage engaged positioning of rolling members 224a-224f (e.g., rolling member holders 223a-223f not impinging upon rolling members 224a-224f to encourage an engaged position and/or rolling member holders 223a-223f oppositely impinging upon rolling members 224a-224f to encourage a disengaged position), the rolling members may be freed from simultaneous and/or firm contact with both a corresponding roller-ramp surface 226a-226f and inward surface 228. For example, upon sufficient rotation of gear 231 for drive members 229a-229d of outer ring 227 to engage second ends of circumferential slots 239a-239d, outer ring 227 will be induced to rotate (e.g., counterclockwise force). Inward surface 228 may thus induce rotation of rolling members 224a-224f such that the rolling members migrate to a central area of their respective roller-ramp surfaces 226a-226f as shown in FIG. 2J. In operation according to embodiments, the sequence of the transmission of force and the buffering (e.g., facilitating a short period of time in which outer ring 227 can rotate at a more rapid rate than inner ring 225 while drive members 229a-229d of outer ring 227 traverse circumferential slots 239a-239d disposed in gear 231, such as in response to an overrunning force, followed by the inner and outer rings again remain stationary relative to each other when drive members 229a-229d engage the other end of slots 23a-239d) implemented by drive members 229a-229d disposed in circumferential slots 239a-239d facilitates a disengaged mode of clutch assembly 220 and avoids any premature engagement of the clutch assembly. Accordingly, rolling members 224a-224f may be disposed in a disengaged position and clutch assembly 220 disengaged. Rolling member holders 223a-223f of embodiments preferably remain relatively positioned so as to encourage rolling members 224a-224f to remain in a disengaged position throughout application of the override force at shaft 202.

Having described an embodiment of autonomous-state transmission 210 according to some examples of the present invention, attention is now directed to FIGS. 3A-3P, wherein the illustrated embodiment of autonomous-state transmission 310 will be described. It should be understood that, although a particular configuration of autonomous-state transmission 310 is shown and described, various changes, substitutions, and alterations may be made with respect to one or more components of the example of autonomous-state transmission 310 without departing from the spirit and scope of the invention.

Figure 3A:
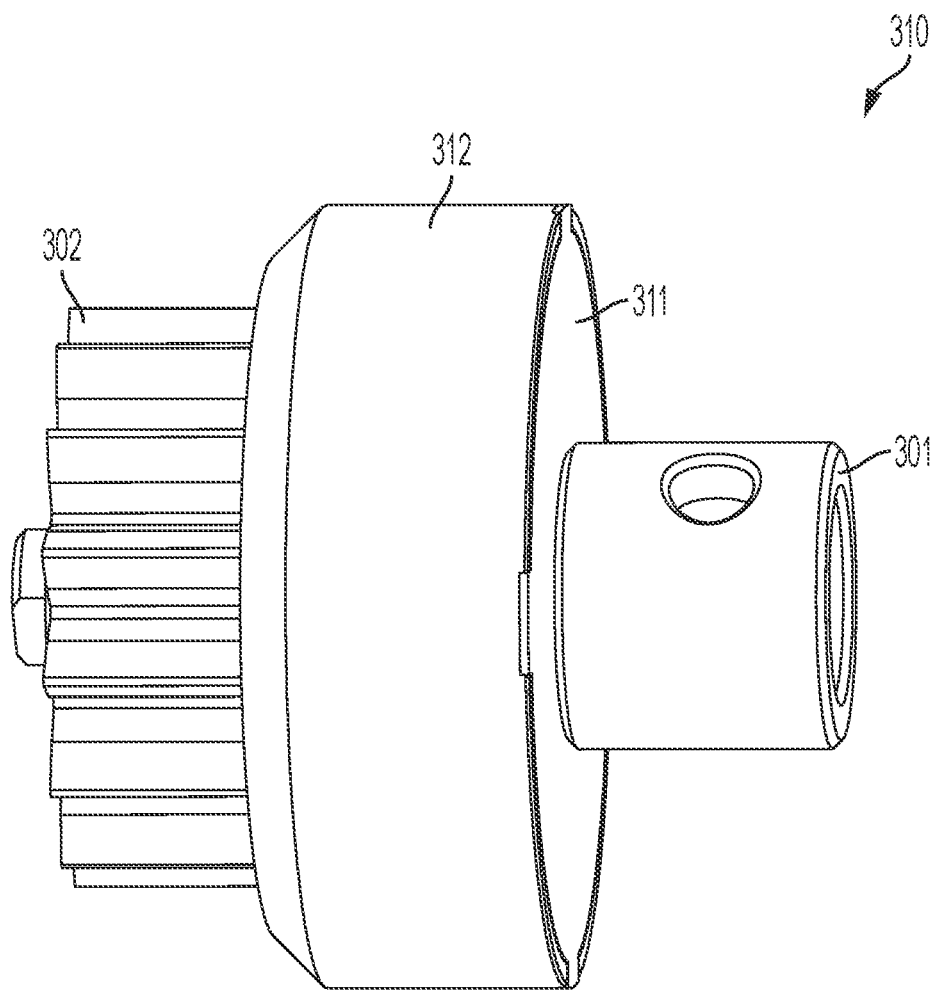
FIGS. 3A-3F show various views of a second exemplary autonomous-state transmission of embodiments of the invention.

As shown in FIG. 3A, autonomous-state transmission 310 includes a driving input member (shown as driving shaft 301) and driven output member (shown as driven gear 302). The driving input member may be provided motive power with respect to a self-propelled garden machine by one or more motors of the garden machine. Autonomous-state transmission 310 autonomously engages and disengages transmission of power from driving shaft 301 to driven gear 302. Driven gear 302 may be in communication with one or more motive members (e.g., wheels, tracks, etc.) of a self-propelled garden machine so as to facilitate self-propelled motive operation of the garden machine. It should be appreciated that driving shaft 301 and/or driven gear 302 of embodiments of autonomous-state transmission 310 may be configured differently than shown, such as to provide input and/or output gears, universal joints, etc.

Autonomous-state transmission 310 of the illustrated embodiment in FIG. 3A is provided in a configuration in which its external interfaces comprise only a driving input member (driving shaft 301) and a driven output member (driven gear 302), wherein the remainder of the componentry thereof is disposed within an enclosure or housing formed from cover 311 and outer ring 327. Accordingly, the motion of driving shaft 301 (e.g., the driving input) and/or driven gear 302 (e.g., the driven output) of autonomous-state transmission 310 is utilized for override force (e.g., manual force sufficient to override self-propelled motive operation of the garden machine) detection and providing override control with respect to a force transfer state of autonomous-state transmission 310.

Figure 3B:
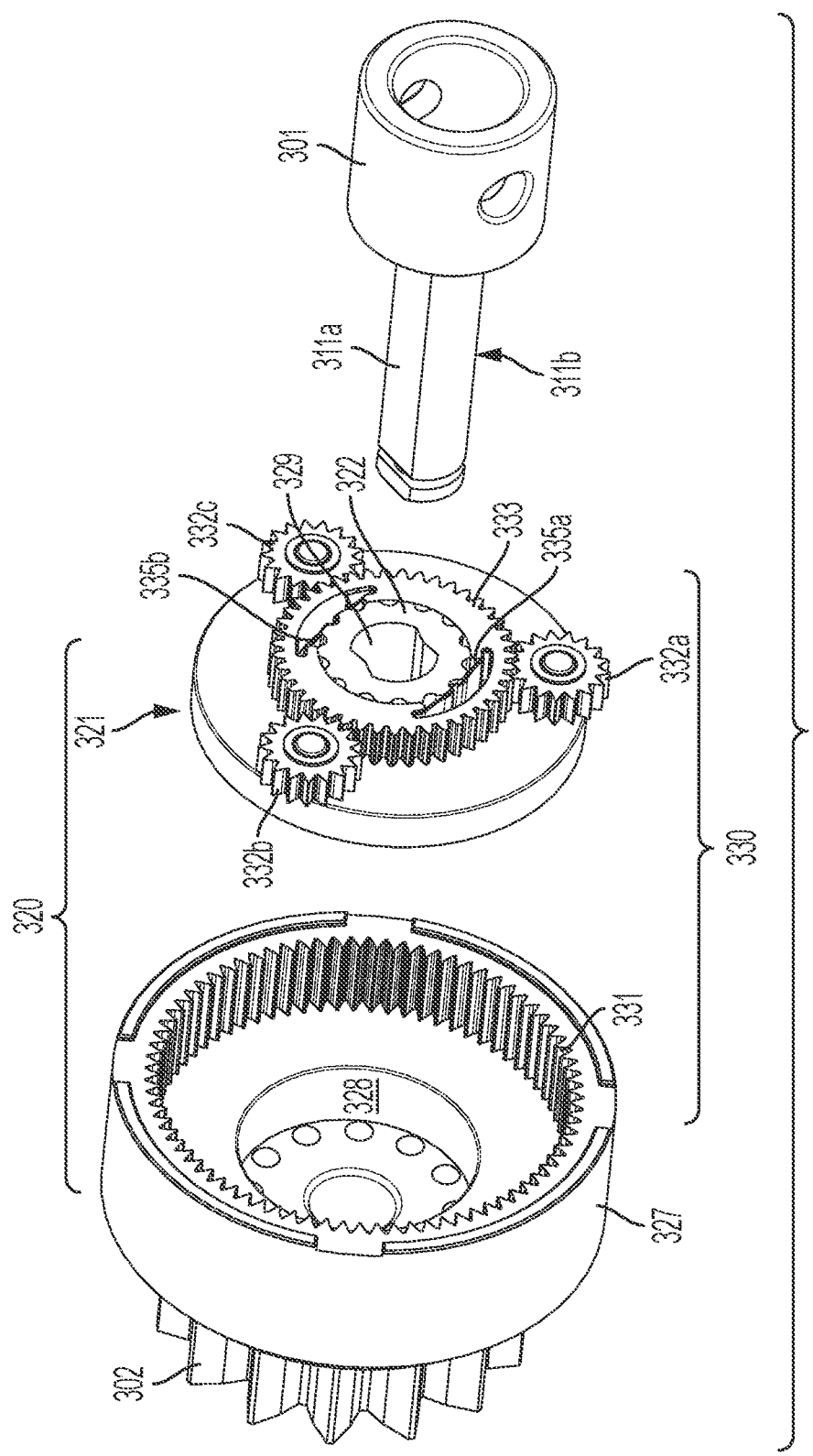
Figure 3C:
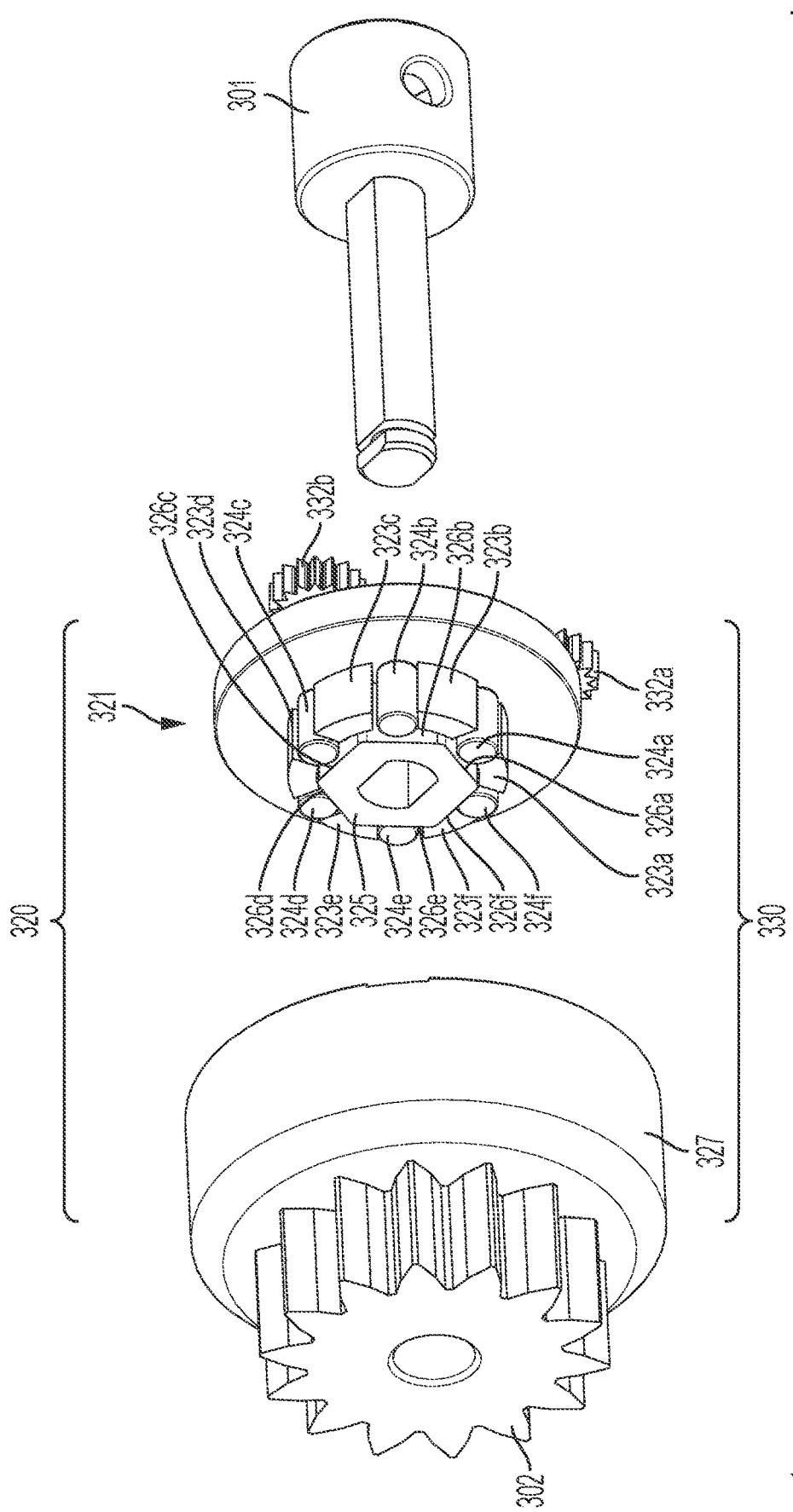

FIGS. 3B and 3C show autonomous-state transmission 310 in an exploded view having cover 311 removed to thereby expose internal componentry thereof. Autonomous-state transmission 310 implements a clutch and associated override control configuration. Accordingly, the illustrated embodiment of autonomous-state transmission 310 includes clutch assembly 320, comprising override control interface 221, rolling members 324a-324f, inner ring 325, and outer ring 327, configured for selectively transferring motive force provided via driving shaft 301 to driven gear 302. Correspondingly, autonomous-state transmission 310 of the illustrated embodiment further includes override force feedback assembly 330, comprising gears 331-333, configured for selectively communicating override forces provided via driven gear 302 to clutch assembly 320, facilitating override control with respect to autonomous-state transmission 310.

The illustrated embodiment of clutch assembly 320 comprises a roller-ramp clutch configuration in communication with override force feedback assembly 330 facilitating control for disengaging the roller-ramp clutch. The exemplary roller-ramp clutch configuration of clutch assembly 320 comprises inner ring 325 coupled to driving shaft 301 (e.g., via a double-D slot configuration allowing some level hysteresis with respect to movement of inner ring 325 induced by driving shaft 301) and outer ring 327 coupled to driven gear 302. Inner ring 325 is preferably coupled to driving shaft 301 such that rotation of driving shaft is transferred to inner ring 325. Override control interface 321 is preferably provided in a relationship with respect to driving shaft 301 that facilitates skidding, such that at least some extent of rotational slippage of override control interface 321 is accommodated in relation to rotation of driving shaft 301.

Similar to the roller-ramp clutch configuration of FIG. 2D above, inner ring 325 nests within a circumference of inward surface 328 of outer ring 327. Inner ring 325 comprises an eccentric outer surface comprising roller-ramp surfaces 326a-326f, wherein the apexes provided at the junctions of the roller-ramp surfaces are disposed more near inward surface 328 of outer ring 327 than is the remaining areas of the roller-ramp surfaces. Rolling members 324a-324f (e.g., cylindrical pins) of clutch assembly 320 are disposed in the area between facing surfaces of a corresponding one of roller-ramp surfaces 326a-326f and inward surface 328. The space or gaps between the apexes of roller-ramp surfaces 326a-326f and inward surface 328 is preferably less than a diameter of rolling members 324a-324f. Roller-ramp surfaces 326a-326f of inner ring 325, rolling members 324a-324f, and inward surface 328 of outer ring 327 of embodiments cooperate to enable engaged and disengaged modes of clutch assembly 320. Cooperative interaction with respect to roller-ramp surfaces 326a-326f of inner ring 325, rolling members 324a-324f, and inward surface 328 of outer ring 327 of the exemplary roller-ramp clutch configuration of clutch assembly 320 may be as described above with reference to FIGS. 4A-4D.

The roller-ramp configuration of clutch assembly 320 engages to transfer motive force provided via driving shaft 301 to driven gear 302 when one or more of rolling members 324a-324f are in simultaneous, firm contact (e.g., pinched so as to prevent their rolling) with their corresponding roller-ramp surface of inner ring 325 and inward surface 328 of outer ring 327. Accordingly, when driven shaft 302 is turned either clockwise or counterclockwise inner ring may 325 turn accordingly, such that turning driven shaft 302 and inner ring 325 with sufficient speed and force will exert centrifugal forces sufficient to encourage rolling members 324a-324f toward respective apexes of the roller-ramp and engage inward surface 328 and be captured in a non-rolling relationship between outer ring 327 and inner ring 325. Inversely, the roller-ramp configuration of clutch assembly 320 disengages to preclude transfer of motive force from driving shaft 301 to driven gear 302 when rolling members 324a-324f are in a rolling relationship with their corresponding roller-ramp surface of inner ring 325 and/or inward surface 328 of outer ring 327 (e.g., rolling within the area between a rolling-ramp surface of rolling-ramp surfaces 326a-36f and inward surface 328).

The exemplary roller-ramp clutch configuration of clutch assembly 320 shown in FIGS. 3B and 3C comprises override control interface 321 operative in cooperation with override force feedback assembly 330 for disengaging the roller-ramp clutch in response to override forces provided via driven gear 302 to clutch assembly 320. Override control interface 321 of the illustrated embodiment includes hub portion 322 and rolling member holders 323a-323f affixed to or formed as part of hub portion 322. According to embodiments of clutch assembly 320, override control interface 321 is disposed in a nested relationship with respect to outer ring 327 and inner ring 225. A nested implementation of override control interface 321 disposes rolling member holders 323a-323f within the area between facing surfaces of inward surface 328 and roller-ramp surfaces 326a-326f, wherein rolling member holders 323a-323f are interleaved with rolling members 324a-324f. That is, in a nested implementation of embodiments, rolling member 324a is disposed between rolling member holders 323a and 323b, rolling member 324b is disposed between rolling member holders 323b and 323c, and so on including rolling member 324f disposed between rolling member holders 323f and 323a.

In operation according to embodiments of the invention, rolling member holders 323a-323f of override control interface 321 may be utilized to encourage or otherwise facilitate engaged and/or disengaged positioning of rolling members 324a-324f. Rolling member holders 323a-323f of embodiments may be controlled to facilitate engaged and/or disengaged positions with respect to rolling members 324a-324f via force transferred by override force feedback assembly 330 through hub portion 322. For example, an override force provided to driven gear 302 may be transferred to override control interface 321 by override force feedback assembly 330 through hub portion 322, which may cause rolling member holders 323a-323f to move relative to rolling members 324a-324f and encourage and/or discourage their engaged and/or disengaged positions. When an override force is not provided to driven gear 302, however, override force feedback assembly 330 is configured to enable override control interface 321 to facilitate rolling members 324a-324f entering and/or remaining in engaged positions.

Figure 3D:
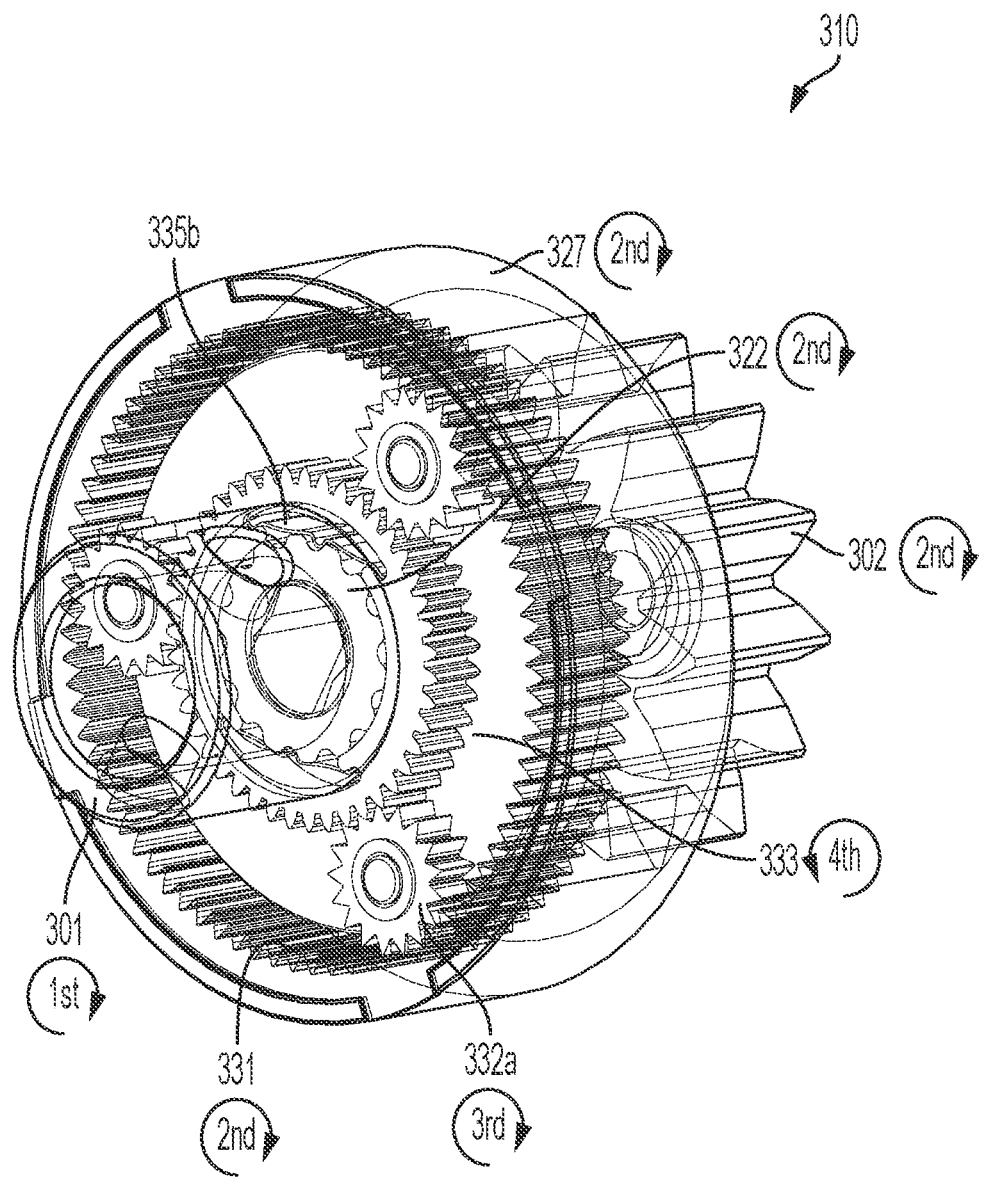

FIG. 3D shows operation of autonomous-state transmission 310 with clutch assembly 320 in an engaged mode according to an example of the disclosure, wherein the direction of rotational force with respect to various components is indicated by the associated angular velocity vectors. The numerals provided in association with the angular velocity vectors shown in FIG. 3D designate the order of transmission of force by the gear components of the example autonomous-state transmission.

The example of FIG. 3D may, for example, correspond to a situation in which a garden machine in which autonomous-state transmission 310 is disposed is operating in the self-propel mode. Although a particular direction (e.g., forward drive or rearward drive) of input/output rotational force (e.g., indicated by the clockwise and counterclockwise angular velocity vectors) is provided, the described operation applies to either forward drive or rearward drive (although the directions of rotational force are reversed).

The example illustrated in FIG. 3D shows operation in which a drive force (e.g., $1^{st}$ order clockwise input force) is applied to driving shaft 301, whereby this force is transmitted to outer ring 327 and thus driven gear 302 through clutch assembly 320 operating in an engaged mode to provide the drive force output (e.g., $2^{nd}$ order clockwise output force). Rotation of outer ring 327 comprises rotation of ring gear 331 (e.g., $2^{nd}$ order clockwise force) of override force feedback assembly 330 defined within a portion of outer ring 327. Gears 332a-332c of override force feedback assembly 330 are disposed as planetary gears within ring gear 331 of the illustrated embodiment (e.g., disposed upon pins affixed to or formed as part of hub portion 322). Accordingly, rotation of ring gear 331 (e.g., $2^{nd}$ order clockwise force) induces rotation of gears 332a-332c (e.g., $3^{rd}$ order clockwise force). Gear 333 of override force feedback assembly 330 is disposed as a sun gear with respect to planetary gears 332a-332c of the example embodiment. Thus, rotation of gears 332a-332c (e.g., $3^{rd}$ order clockwise force) induces rotation of gear 333 (e.g., $4^{th}$ order counterclockwise force).

Override control interface 321 is encouraged to rotate according to the drive force applied to driving shaft 301. For example, as shown in the exploded diagram of FIG. 3E in which an embodiment of override control interface 321 is shown removed from driving shaft 301, override control interface 321 is coupled to driving shaft 301 via a double-D slot configuration allowing some level hysteresis with respect to movement of override control interface 321 with respect to driving shaft 301. Accordingly, rolling member holders 323a-323f are enabled to move at least to some extent with respect to rolling members 324a-324f. Rolling members 324a-324f of clutch assembly 320 in their engaged positions may impinge upon rolling member holders 323a-323f of override control interface 321, whereby rolling member holders 323a-323f operate to block rolling members 324a-324f from moving from the engaged positions to disengaged positions e.g., similar to the configuration illustrated in FIG. 2F). During continued engaged operation of clutch assembly 320, hub portion 322 of override control interface 321 is induced by the force applied to driving shaft 301 (e.g., $1^{st}$ order clockwise force) to rotate accordingly (e.g., $2^{nd}$ order clockwise force).

As can be seen in the illustration of FIG. 3D, when operating in the exemplary engaged mode, gear 333 of override force feedback assembly 330 and hub portion 322 of override control interface 321 are rotating in contrariwise directions (e.g., gear 333 rotating in a counterclockwise direction and hub portion 322 rotating in a clockwise direction). Accordingly, gear 333 of override force feedback assembly 330 and/or hub portion 322 of override control interface 321 preferably accommodate at least some extent of rotational slippage with respect to each other. In accordance with some embodiments of the invention, gear 333 and hub portion 322 are interfaced via a skidding mechanism facilitating limited slipping between gear 333 and hub portion 322.

Figure 3E:
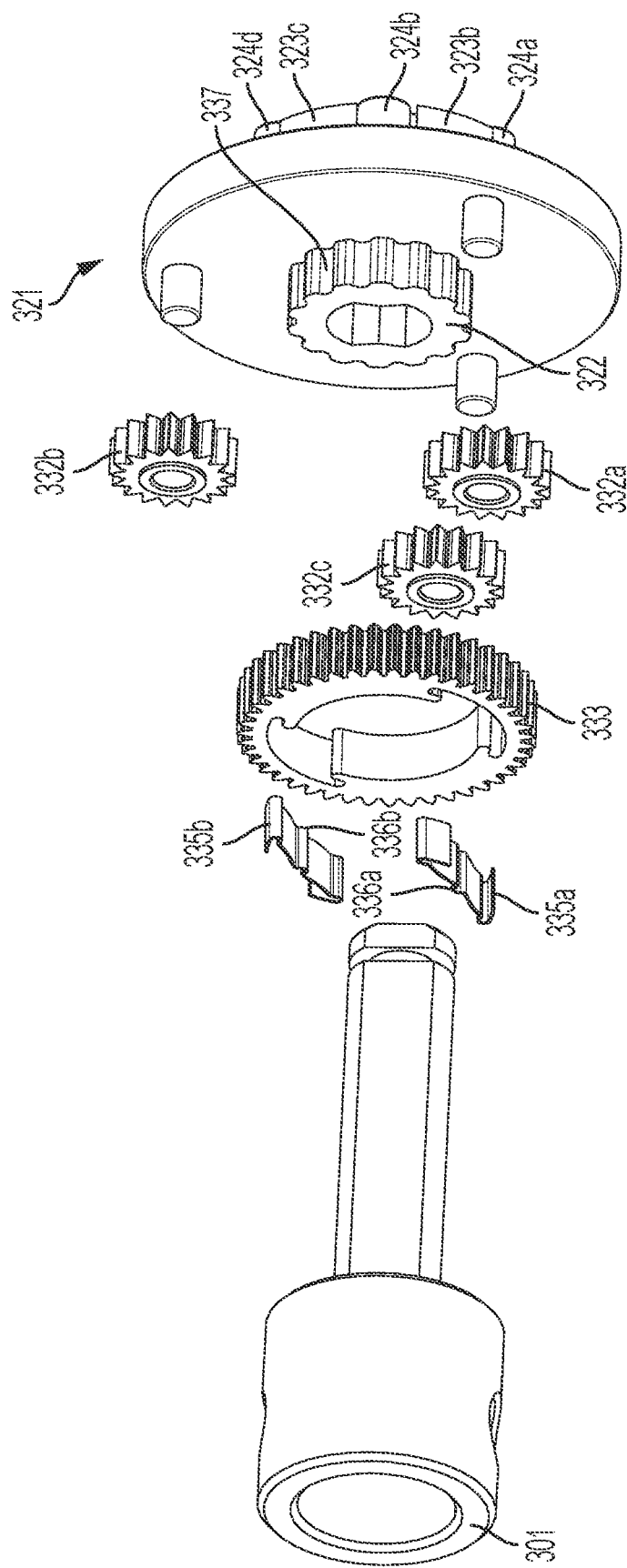

FIG. 3E shows portions of an exemplary skidding mechanism as may be utilized with respect to override control interface 321 and override force feedback assembly 330. In the illustrated example, bias elements 335a and 335b are provided with tab elements 336a and 336b respectively. Gear 333 of the illustrated example is adapted to retain bias elements 335a and 335b for engaging hub portion 322. Bias elements 335a and 335b may, for example, comprise spring biased members disposing tab elements 336a and 336b in communication with a surface of hub portion 322. Correspondingly, in addition to having an orifice for accepting the body of shaft 301, hub portion 322 includes undulating outer surface 337. Tab element 336a and 336b engage undulating inner surface 337 to facilitate skidding of hub portion 322, and correspondingly override control interface 321, relative to rotation of gear 333 when a suitable relative force is present with respect to the rotation of override control interface 321 and gear 322. Embodiments of the foregoing skidding mechanism are configured for skidding action whereby the override control does not interfere with an engaged state of a clutch in normal motive operation. For example, the depth of undulations of undulating outer surface 337, the length of tab elements 336a and 336b, and/or the force of a spring bias provided by bias elements 335a and 335b may be configured to accommodate skidding of hub portion 322 with respect to rotation of gear 333 when hub portion 322 and gear 333 are rotating in contrariwise directions associated with autonomous-state transmission 310 with clutch assembly 320 in an engaged mode.

Figure 3F:
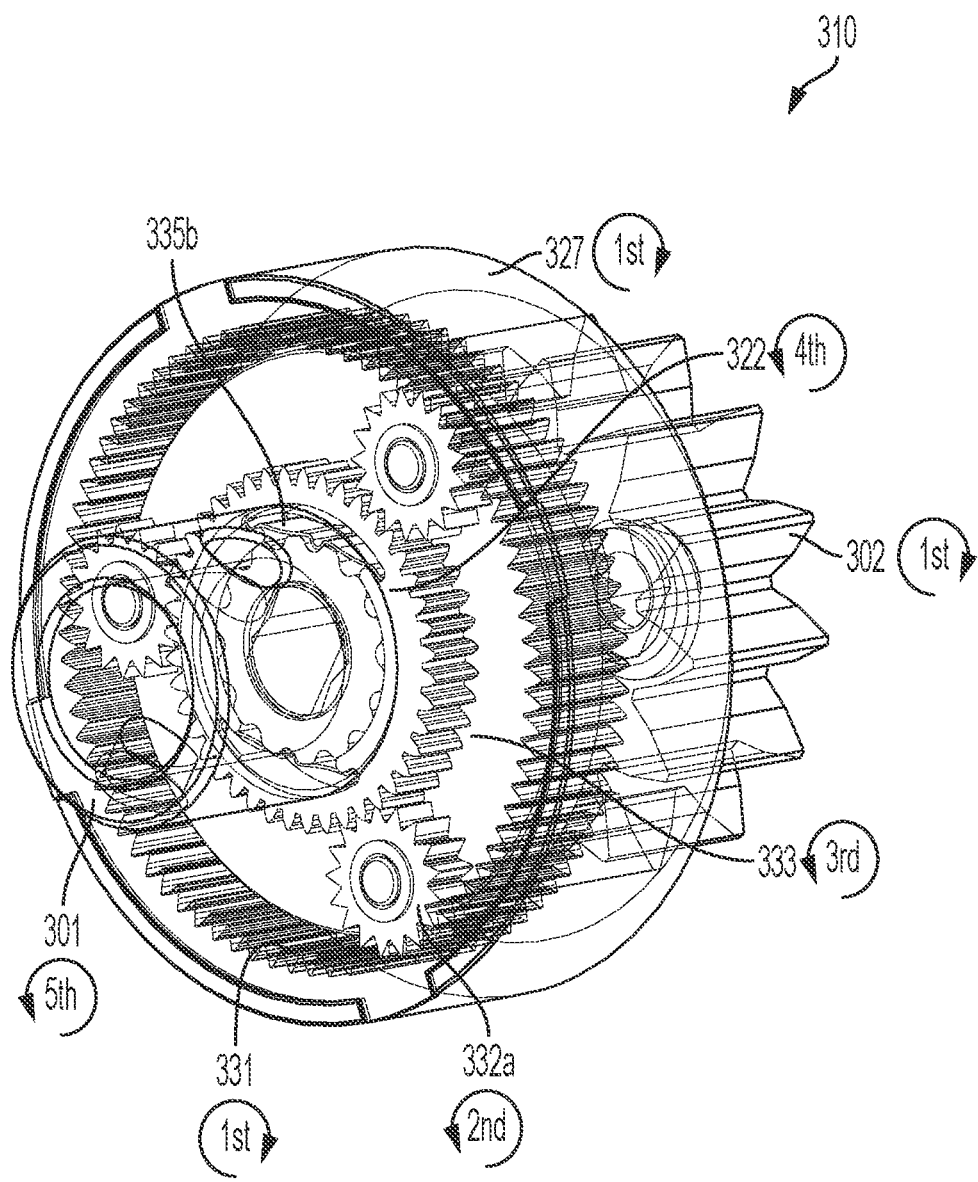

FIG. 3F shows operation of autonomous-state transmission 310 with clutch assembly 320 in a disengaged mode according to an example of the disclosure. As with the previous examples, the numerals provided in association with the angular velocity vectors shown in FIG. 3F designate the order of transmission of force by the gear components of the example autonomous-state transmission.

The example of FIG. 3F may, for example, correspond to a situation in which a garden machine in which autonomous-state transmission 310 is disposed is being manually pushed while a motor for providing motive force is turned off. Although a particular direction (e.g., pushing or pulling of a garden machine) of rotational force (e.g., indicated by the clockwise and counterclockwise angular velocity vectors) is provided, the described operation applies to movement in either direction (although the directions of rotational force are reversed). Further, the operational description of the example also applies to overrun mode (e.g., where a user overruns the motive operation of the garden machine), although in that situation the clockwise and counterclockwise denotation is a relative rather than absolute. Accordingly, the illustrated configuration of autonomous-state transmission 310 provides a bidirectional autonomous-state transmission configuration which may operate to disengage (e.g., cease transmission of power from the driving input to the driven output) from an otherwise engaged state (e.g., providing motive forces for forward self-propulsion or backward self-propulsion) in response both to an overriding force in the motive direction (e.g., overrunning force associated with overrunning the motive operation) and an overriding force opposite the motive direction (e.g., underrunning force associated with underrunning the motive operation). In particular, bidirectional autonomous-state transmission 310 is configured to transition from an engaged state to a disengaged state in response to a user pushing a walk-behind garden machine equipped with the bidirectional autonomous-state transmission with sufficient force to override self-propelled motive operation (e.g., override force) and manually push the garden machine at a faster rate than the self-propulsion provided by the bidirectional autonomous-state transmission (e.g., overrunning the bidirectional autonomous-state transmission). Further, bidirectional autonomous-state transmission 310 is configured to transition from an engaged state to a disengaged state in response to the user pulling the walk-behind garden machine equipped with the bidirectional autonomous-state transmission with sufficient force to override self-propelled motive operation to manually retard the movement of the garden machine at a slower rate than (or even reverse) the self-propulsion provided by the bidirectional autonomous-state transmission (e.g., underruning the bidirectional autonomous-state transmission).

The example illustrated in FIG. 3F shows operation in which a force (e.g., $1^{st}$ order clockwise force), such as associated with a user manually pushing or overrunning self-propelled operation of a garden machine, is applied to driven gear 302. In a situation where clutch assembly 320 was operating in an engaged mode immediately prior to the application of the noted force at driven gear 302, rotation of gear 302 may provide corresponding rotation of outer ring 327 (e.g., the $1^{st}$ order clockwise force) attached thereto. Rotation of outer ring 327 (e.g., $1^{st}$ order clockwise force) correspondingly results in rotation of ring gear 331 (e.g., $1^{st}$ order clockwise force) of override feedback assembly 330. Gears 332a-332c of override force feedback assembly 330 are disposed as planetary gears within ring gear 331 of the illustrated embodiment. Accordingly, rotation of ring gear 331 (e.g., $1^{st}$ order clockwise force) induces rotation of gears 332a-332c (e.g., $2^{nd}$ order clockwise force). Gear 333 of override force feedback assembly 330 is disposed as a sun gear with respect to planetary gears 332a-332c of the example embodiment. Thus, rotation of gears 332a-332c (e.g., $2^{nd}$ order clockwise force) induces rotation of gear 333 (e.g., $3^{rd}$ order counterclockwise force).

As described above, gear 333 and hub portion 332 of embodiments accommodate at least some extent of rotational slippage with respect to gear 333 and hub portion 332. For example, the example illustrated in FIG. 3E provides a skidding mechanism facilitating limited slipping between gear 333 and hub portion 322. In the current example, a motor providing motive force is off, such that rotational force is not being transmitted to override control interface 321. Similarly, in overrun mode operation, the relative rotational forces produce the same effect. Accordingly, in these situations, hub portion 322 of embodiments engages gear 333 in a non-skidding relationship such that gear 333 transmits rotational force to hub portion 322 (e.g., inducing a $4^{th}$ order clockwise force). That is, although hub portion 322 is configured to accommodate skidding of gear 333 with respect to rotation of gear 333 when gear 333 and hub portion 322 are rotating in contrariwise directions associated with autonomous-state transmission 310 with clutch assembly 320 in an engaged mode, hub portion 322 is configured to engage gear 333 without skidding with respect to rotation of gear 333 when autonomous-state transmission 310 is receiving override force via gear 302. Embodiments of the foregoing skidding mechanism are configured for non-skidding action in response to override forces (e.g., overrunning and/or underrunning) transmitted via gear 302 to provide feedback control with respect to a disengaged state of clutch assembly 320. For example, the depth of undulations of undulating inner surface 337 (FIG. 3E), the length of tab elements 336a and 336b, and/or the force of a spring bias provided by bias elements 335a and 335b may be configured to accommodate non-skidding of hub portion 322 with respect to rotation of gear 333 when overriding force is present with respect to gear 302 consistent with operation of clutch assembly 320 in a disengaged mode. In accordance with embodiments of the invention, one or more aspects of the skidding mechanism of autonomous-state transmission 310 are selected so that skidding action occurs during self-propelled motive operation of a garden machine in which the autonomous-state transmission is disposed, while non-skidding action occurs during overrunning and/or underrunning the motive operation of the garden machine.

In operation according to the illustrated example, hub portion 322 provides force (e.g., $4^{th}$ order clockwise force) to override control interface 321 of clutch assembly 320. Rotation of override control interface 321 provides for corresponding movement of rolling member holders 323a-323f thereof, without initially also causing rotation of inner ring 325 of clutch assembly 320. That is, the double-D shaped circumference of orifice 329 of gear 333 coupling embodiments of override control interface 321 to driving shaft 301 allows some level hysteresis with respect to movement of override control interface 321 relative to driving shaft 301 and correspondingly inner ring 325. Rotation of override control interface 321 proceeds without inducing rotation of inner ring 325 until the double-D circumference of orifice 329 is traversed by the flat surfaces 311a and 311b of driven shaft 301 and engage second (opposite) sides thereof (e.g., thereafter inducing $5^{th}$ order counterclockwise rotation of driving shaft 301). Where clutch assembly 320 is initially in an engaged mode (e.g., similar to the illustration of FIG. 2F), rolling member holders 323a-323f may rotate to move away from corresponding ones of rolling members 324a-324f (e.g., rolling member holders 323a-323f may cease to impinge upon rolling members 324a-324f, similar to the illustration of FIG. 2I) and encourage or otherwise facilitate disengaged positioning of rolling members 324a-324f.

Buffering resulting from interaction between the double-D circumference of orifice 329 of gear 333 interfacing with flat surfaces 311a and 311b of driving shaft 301 disposed within orifice 329 facilitates a disengaged mode of clutch assembly 320 according to some embodiments of the invention. In an example of disengaging of the roller-ramp clutch configuration, an overrunning force may cause outer ring 327 to rotate at a more rapid rate than inner ring 325, at least for a short period of time. The sequence of the transmission of force and the buffering (e.g., facilitating a short period of time in which outer ring 327 can rotate at a more rapid rate than inner ring 325 while flat surfaces 311a and 311b of driving shaft 301 rotate within the double-D circumference of orifice 329, such as in response to an overrunning force, followed by the inner and outer rings again remaining stationary relative to each other when flat surfaces 311a and 311b engage the other side of the double-D circumference of orifice 329) implemented by flat surfaces 311a and 311b disposed in the double-D circumference of orifice 329 facilitates a disengaged mode of clutch assembly 320. Accordingly, rolling members 324a-324f may be disposed in a disengaged position and clutch assembly 320 disengaged. Rolling member holders 323a-323f of embodiments preferably remain relatively positioned so as to encourage rolling members 324a-324f to remain in a disengaged position throughout application of the override force at driven gear 302.

In accordance with embodiments of clutch assembly 320, with rolling member holders 323a-323f not in a position to encourage engaged positioning of rolling members 324a-324f (e.g., rolling member holders 323a-323f not impinging upon rolling members 324a-324f to encourage an engaged position and/or rolling member holders 323a-323f oppositely impinging upon rolling members 324a-324f to encourage a disengaged position), the rolling members may be freed from simultaneous and/or firm contact with both a corresponding roller-ramp surface 326a-326f and inward surface 328. For example, upon sufficient rotation of hub portion 322, inward surface 328 may induce rotation of rolling members 324a-324f such that the rolling members migrate to a central area of their respective roller-ramp surfaces 326a-326f (e.g., similar to the illustration of FIG. 2J). In operation according to embodiments, the sequence of the transmission of force facilitates a disengaged mode of clutch assembly 320. Accordingly, rolling members 324a-324f may be disposed in a disengaged position and clutch assembly 320 disengaged. Rolling member holders 323a-323f of embodiments preferably remain relatively positioned so as to encourage rolling members 324a-324f to remain in a disengaged position throughout application of the override force at gear 302.

Although the examples above have been described with reference to a particular direction of applied force in order to provide details for an understanding of the concepts herein, it should be appreciated that autonomous-state transmissions of embodiments are nevertheless bidirectionally operative to autonomously engage and disengage transmission of power from a driving input member to a driven output member. Bidirectional autonomous-state transmissions of embodiments of the invention may, for example, operate to disengage from an otherwise engaged state (e.g., providing motive forces for forward self-propulsion or backward self-propulsion) in response both to an overriding force in the motive direction (e.g., overrunning the motive operation) and an overriding force opposite the motive direction (e.g., underrunning the motive operation).

It can be seen from the examples above that autonomous-state transmissions of embodiments of the invention comprise a transmission unit configured to autonomously engage and disengage transmission of power from a driving input member to a driven output member without utilization of gearing or additional mechanical feedback external to the transmission unit which is wholly contained within a single enclosure or contiguous housing (e.g., having only a driving input and driven output as external interfaces). In operation of autonomous-state transmissions 210 and 310 according to examples herein, the autonomous-state transmissions may rely exclusively upon motion of the driving input member and/or driven output member for engaging/disengaging transmission of power from the driving input member to the driven output member.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. An autonomous-state transmission configured for providing self-propelled motive operation of a garden machine, the autonomous-state transmission comprising:
   a driving input member;
   a driven output member;
   a clutch assembly coupled to the driving input member and the driven output member and providing controlled rotational force transmission between the driving input member and the driven output member, wherein the clutch assembly comprises an override control interface; and
   an override force feedback assembly directly connected both to the driven output member and the override control interface of the clutch assembly and providing communication of an override force, when present at the driven output member, from the driven output member to the clutch assembly autonomously controlling a force transfer state of a plurality of force transfer states of the autonomous-state transmission.

2. The autonomous-state transmission of claim 1, wherein the clutch assembly and the override force feedback assembly are each fully contained within a contiguous enclosure having only the driving input member and the driven output member as external interfaces for force input and output.

3. The autonomous-state transmission of claim 1, wherein the override force feedback assembly is configured for communicating both an overrunning force and an underrunning force as the override force providing a bidirectional autonomous-state transmission configuration.

4. The autonomous-state transmission of claim 1, further comprising: a skidding mechanism, wherein the override force feedback assembly communicates the override force to the override control interface via the skidding mechanism.

5. The autonomous-state transmission of claim 4, wherein the skidding mechanism is operative to provide skidding action whereby override control of the override force feedback assembly and the override control interface does not interfere with a first force transfer state of the autonomous-state transmission in motive operation, and wherein the skidding mechanism is operative to provide non-skidding action in response to the override force whereby override control of the override force feedback assembly and the override control interface controls a second force transfer state of the autonomous-state transmission.

6. The autonomous-state transmission of claim 5, wherein the first force transfer state comprises an engaged state and the second force transfer state comprises a disengaged state, and wherein the override force comprises an overrunning force whereby the motive operation provided by the autonomous-state transmission is manually overrun.

7. The autonomous-state transmission of claim 5, wherein the first force transfer state comprises an engaged state and the second force transfer state comprises a disengaged state, and wherein the override force comprises an underrunning force whereby the motive operation provided by the autonomous-state transmission is manually underrun.

8. The autonomous-state transmission of claim 4, wherein the skidding mechanism comprises:
   one or more biased tab elements impinging upon an undulating surface of a rotational member of the autonomous-state transmission.

9. The autonomous-state transmission of claim 8, wherein the skidding mechanism comprises:
   a gear of the override force feedback assembly having the undulating surface as an inner surface thereof; and
   a hub of the override force feedback assembly interfaced with the gear and having the one or more biased tab elements thereon.

10. The autonomous-state transmission of claim 8, wherein the skidding mechanism comprises:
    a gear of the override force feedback assembly having the one or more biased tab elements thereon; and a hub of the override control interface having the undulating surface as an outer surface thereof.

11. The autonomous-state transmission of claim 1, wherein an interface between the clutch assembly and the driven output member implement results in buffering configured to facilitate transition to a disengaged state of the plurality of force transfer states and avoiding premature engagement of the clutch assembly.

12. The autonomous-state transmission of claim 11, wherein the buffering is implemented by one or more drive members engaging a corresponding circumferential slot of one or more circumferential slots.

13. A method of motive operation of a garden machine, the method comprising: inputting a motive force to a driving input member of an autonomous-state transmission of the garden machine operating in a self-propelled mode corresponding to an engaged state of the autonomous-state transmission;

inputting an override force to a driven output member of the autonomous-state transmission;

transferring the override force present at the driven output member to a clutch assembly of the autonomous-state transmission to provide override control of the autonomous-state transmission from the engaged state to a disengaged state, wherein the override force is transferred from the driven output member to the clutch assembly via an override force feedback assembly coupled directly to the driven output member and to an override control interface of the clutch assembly.

14. The method of claim 13, wherein the clutch assembly and the override force feedback assembly are each fully contained within a contiguous enclosure having only the driving input member and the driven output member as external interfaces for force input and output.

15. The method of claim 13, wherein the override force comprises an overrunning force whereby the self-propelled mode is manually overrun.

16. The method of claim 13, wherein the override force comprises an underrunning force whereby the self-propelled mode is manually underrun.

17. The method of claim 13, wherein transferring the override force present at the driven output member to the clutch assembly transfers the override force via a skidding mechanism.

18. The method of claim 17, wherein transferring the override force present at the driven output member to the clutch assembly comprises:

non-skidding action of the skidding mechanism.

19. The method of claim 18, wherein the skidding mechanism is operative to provide skidding action in an engaged state of the autonomous-state transmission when the override force is not present at the driven output member.

20. The method of claim 17, wherein the skidding mechanism comprises one or more biased tab elements impinging upon an undulating surface of a rotational member of the autonomous-state transmission.

* * * * *